US010108194B1

(12) United States Patent
Russell

(10) Patent No.: US 10,108,194 B1
(45) Date of Patent: Oct. 23, 2018

(54) OBJECT PLACEMENT VERIFICATION

(71) Applicant: X Development LLC, Mountain View, CA (US)

(72) Inventor: Jared Russell, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 27 days.

(21) Appl. No.: 15/255,390

(22) Filed: Sep. 2, 2016

(51) Int. Cl.
*G05D 1/02* (2006.01)

(52) U.S. Cl.
CPC ......... *G05D 1/0212* (2013.01); *G05D 1/0242* (2013.01); *G05D 1/0246* (2013.01); *G05D 1/0248* (2013.01); *G05D 1/0257* (2013.01); *G05D 2201/0216* (2013.01)

(58) Field of Classification Search
USPC .......................................................... 701/25
See application file for complete search history.

(56) References Cited

U.S. PATENT DOCUMENTS

| 4,328,422 | A |   | 5/1982 | Loomer |            |
|-----------|---|---|--------|--------|------------|
| 5,170,352 | A |   | 12/1992| McTamaney et al. | |
| 5,463,721 | A |   | 10/1995| Tam    |            |
| 5,801,966 | A |   | 9/1998 | Ohashi |            |
| 5,850,370 | A | * | 12/1998| Stringer | G01B 11/00 |
|           |   |   |        |        | 367/128    |
| 6,653,935 | B1|   | 11/2003| Winner et al. |     |
| 7,286,157 | B2| * | 10/2007| Buehler | G06K 9/00771 |
|           |   |   |        |        | 348/143    |
| 7,332,890 | B2| * | 2/2008 | Cohen  | A47L 9/2857 |
|           |   |   |        |        | 320/109    |
| 7,389,210 | B2|   | 6/2008 | Kagarlis |          |
| 7,804,498 | B1| * | 9/2010 | Graham | G06T 11/206 |
|           |   |   |        |        | 345/419    |
| 7,865,398 | B2|   | 1/2011 | Schon  |            |

(Continued)

FOREIGN PATENT DOCUMENTS

JP  2009012493 A   1/2009
WO  WO2012167301 A1  12/2012

OTHER PUBLICATIONS

Wan Ngah et al., A Simple Local Path Planning Algorithm for Autonomous Mobile Robots, International Journal of Systems Applications, Engineering & Development, Issue 2, vol. 5, 2011.

(Continued)

*Primary Examiner* — Jean Paul Cass
(74) *Attorney, Agent, or Firm* — McDonnell Boehnen Hulbert & Berghoff LLP

(57) ABSTRACT

An example system may include a vehicle, a sensor, and a control system that may determine a target location for an object carried by the vehicle. The control system may also determine a plurality of points defining a boundary of a volume to be occupied by the object at the target location. The plurality of points may be scannable in a sequence by the sensor to scan the volume. The control system may additionally determine a respective field of visibility to each respective point. Further, the control system may determine a path for the vehicle to follow to the target location. The respective field of visibility may intersect with at least a respective portion of the determined path such that each respective point is observable by the sensor along at least the respective portion of the determined path as the vehicle moves along the determined path to the target location.

20 Claims, 17 Drawing Sheets

(56) References Cited

U.S. PATENT DOCUMENTS

| | | |
|---|---|---|
| 8,260,483 B2 | 9/2012 | Barfoot et al. |
| 8,340,901 B2 | 12/2012 | Fahn et al. |
| 8,437,544 B2 * | 5/2013 | Boncyk .............. G06F 17/30259 |
| | | 382/165 |
| 9,098,753 B1 | 8/2015 | Zhu et al. |
| 9,104,202 B2 * | 8/2015 | Pack .................... G05D 1/0038 |
| 9,170,116 B1 | 10/2015 | Joshi et al. |
| 9,170,581 B2 | 10/2015 | Bell et al. |
| 9,183,560 B2 * | 11/2015 | Abelow ................ G06Q 10/067 |
| 9,261,881 B1 * | 2/2016 | Ferguson .............. G05D 1/0236 |
| 9,321,529 B1 * | 4/2016 | Jones ...................... B64C 39/02 |
| 9,457,900 B1 * | 10/2016 | Jones ...................... B64C 39/02 |
| 9,513,127 B2 * | 12/2016 | Goldman .............. G01C 21/206 |
| 9,582,001 B1 * | 2/2017 | Holmberg ............. B62D 5/0418 |
| 9,592,759 B1 * | 3/2017 | Theobald ............. B65G 1/0492 |
| 9,643,316 B2 * | 5/2017 | Krasny .................. B25J 9/1666 |
| 9,702,707 B2 * | 7/2017 | Goldman ............. G05D 1/0272 |
| 9,715,232 B1 * | 7/2017 | Fischer ................... G01S 17/08 |
| 9,746,852 B1 * | 8/2017 | Watts .................... G01S 17/936 |
| 9,933,784 B1 * | 4/2018 | Herbach ............... B60W 30/00 |
| 2002/0021954 A1 | 2/2002 | Winkler |
| 2002/0141645 A1 | 10/2002 | Rajagopal et al. |
| 2002/0169586 A1 | 11/2002 | Rankin et al. |
| 2004/0193363 A1 | 9/2004 | Schmidt |
| 2006/0129277 A1 * | 6/2006 | Wu .......................... G06F 3/015 |
| | | 700/245 |
| 2007/0122026 A1 | 5/2007 | Errsue et al. |
| 2007/0219720 A1 | 9/2007 | Trepagnier et al. |
| 2008/0059015 A1 | 3/2008 | Whittaker et al. |
| 2008/0262669 A1 | 10/2008 | Smid et al. |
| 2009/0140887 A1 * | 6/2009 | Breed .................. G01C 21/165 |
| | | 340/990 |
| 2012/0239224 A1 | 9/2012 | McCabe et al. |
| 2012/0330458 A1 | 12/2012 | Weiss |
| 2013/0080360 A1 * | 3/2013 | Sterritt .................. G05B 13/02 |
| | | 706/14 |
| 2014/0074342 A1 | 3/2014 | Wong et al. |
| 2014/0112201 A1 | 4/2014 | Ferre et al. |
| 2014/0277691 A1 | 9/2014 | Jacobus et al. |
| 2015/0073589 A1 | 3/2015 | Khodl et al. |
| 2017/0176575 A1 * | 6/2017 | Smits .................... G01S 17/003 |
| 2017/0227963 A1 * | 8/2017 | Klinger ................ G05D 1/0214 |

OTHER PUBLICATIONS

Karaman et al., Closed-loop Pallet Engagement in an Unstructured Environment, Proceedings of the IEEE/RSJ International Conference on Intelligent Robots and Systems (IROS), 2010.

* cited by examiner

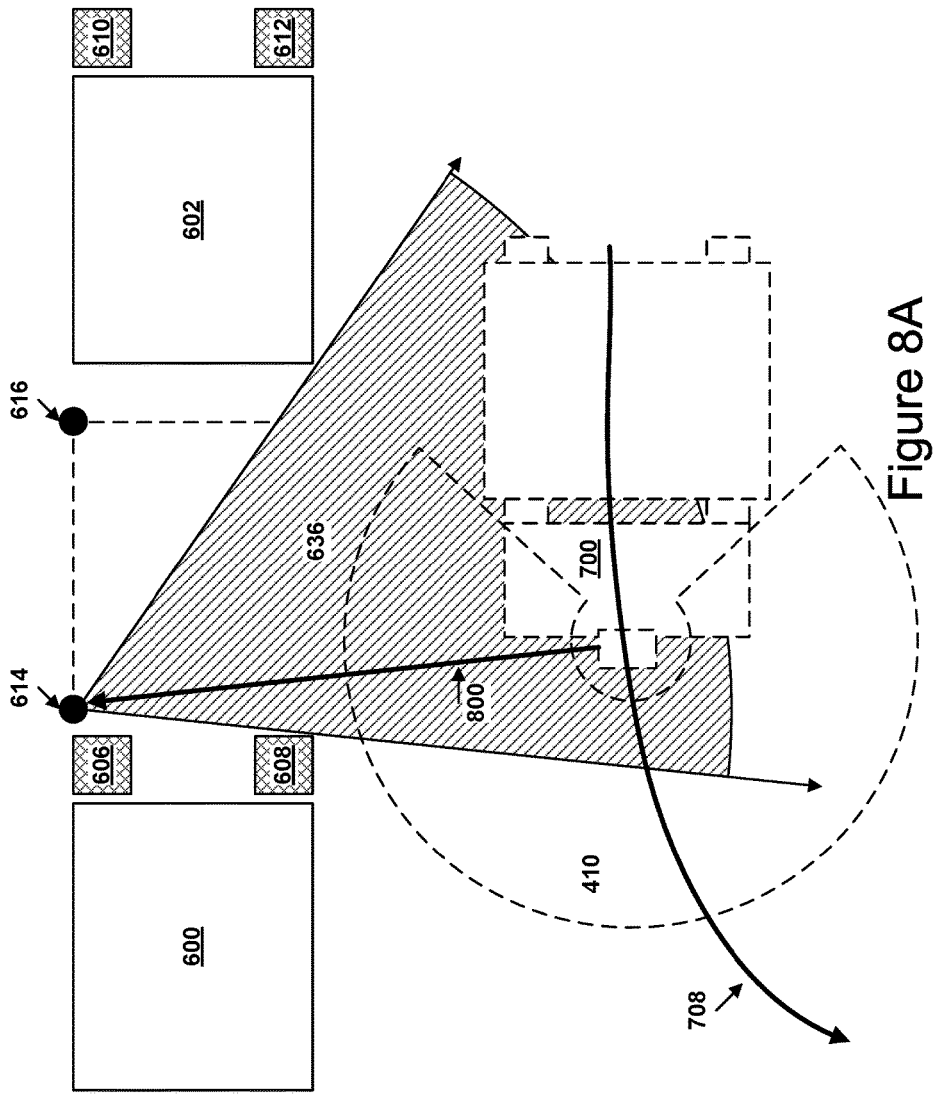

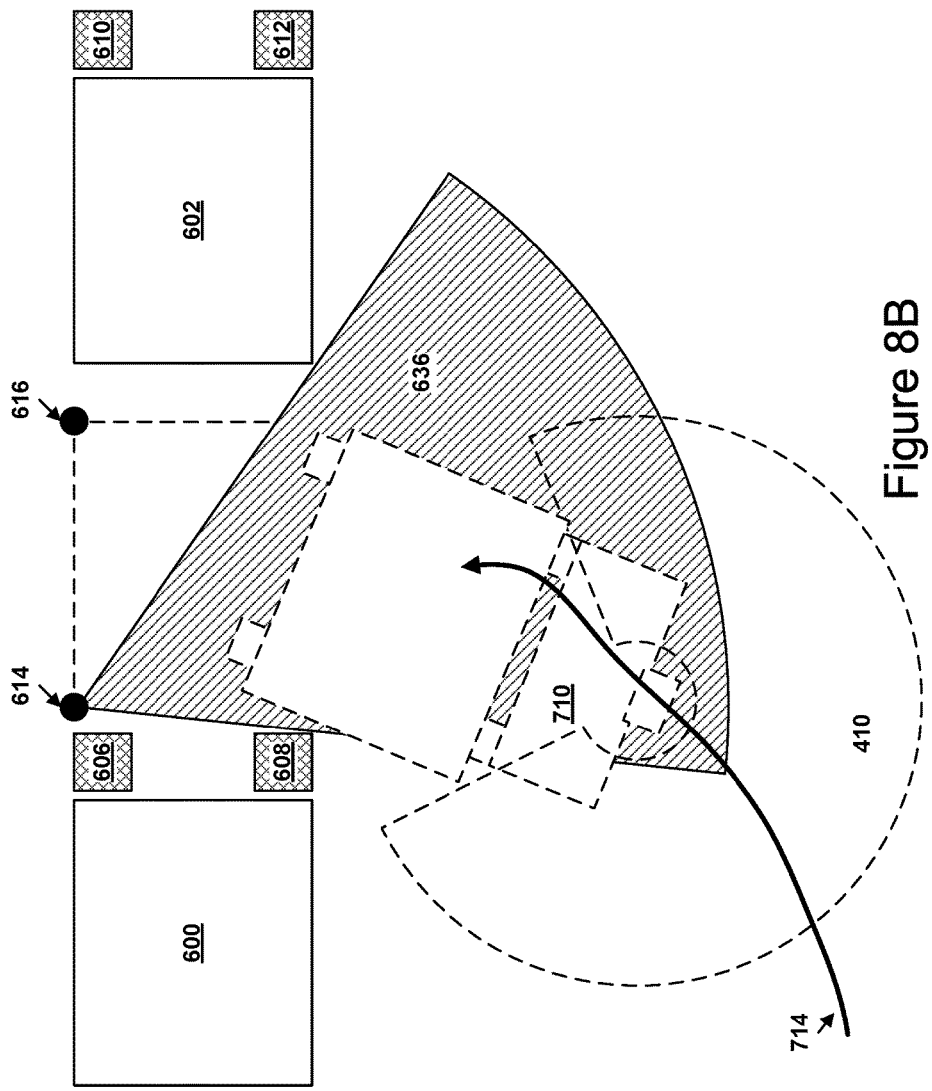

US 10,108,194 B1

OBJECT PLACEMENT VERIFICATION

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes, forklifts, and pallet jacks. Human operators may be employed to operate machines, vehicles, and other equipment. In some cases, one or more of the machines or vehicles may be robotic devices guided by computer control systems.

SUMMARY

Example embodiments include operations for planning a path for a vehicle to follow to a target location to be occupied by the vehicle or an object carried by the vehicle. The path may be determined to allow sensors connected to the vehicle to scan a volume predicted to be occupied by the vehicle and/or the object carried by the vehicle at the target location. In some examples, the target location may be a drop-off location for the object. A plurality of points may be determined that define the boundary of the volume to be occupied by the vehicle and/or the object at the target location. The points may represent vertices of a convex hull defining the volume to be occupied by the vehicle and/or the object at the target location. The points may be scannable in a sequence by the sensors to produce a scan the volume. For each respective point of the plurality of points, a respective field of visibility to the respective point may be determined. The path for the vehicle to follow may be determined based on the respective fields of visibility. Specifically, each respective field of visibility may intersect with at least a respective portion of the determined path such that each respective point of the plurality of points may be observable by at least one of the sensors along at least a section of the respective portion of the determined path as the vehicle moves along the determined path to the target location. The sensors may scan each of the plurality of points in a sequence, thus scanning the volume to be occupied by the vehicle and/or the object at the target location to determine whether the target location is free of obstacles.

In one example, a method is provided that includes determining a target location for an object carried by a vehicle. The method also includes determining a plurality of points defining a boundary of a volume to be occupied by the object at the target location. The plurality of points are scannable in a sequence by a sensor on the vehicle to produce a scan of the volume. The method additionally includes determining a respective field of visibility to each respective point of the plurality of points. The method further includes determining a path for the vehicle to follow to the target location, where the respective field of visibility intersects with a respective portion of the determined path such that each respective point of the plurality of points is observable by the sensor along at least a section of the respective portion of the determined path as the vehicle moves along the determined path to the target location. The method yet further includes causing the vehicle to follow the determined path to the target location.

In another example embodiment, non-transitory computer readable storage medium is provided having stored thereon instructions that, when executed by a computing device, cause the computing device to perform operations. The operations include determining a target location for an object carried by a vehicle. The operations also include determining a plurality of points defining a boundary of a volume to be occupied by the object at the target location. The plurality of points are scannable in a sequence by a sensor on the vehicle to produce a scan of the volume. The operations may additionally include determining a respective field of visibility to each respective point of the plurality of points. The operations may further include determining a path for the vehicle to follow to the target location, where the respective field of visibility intersects with a respective portion of the determined path such that each respective point of the plurality of points is observable by the sensor along at least a section of the respective portion of the determined path as the vehicle moves along the determined path to the target location. The operations may yet further include causing the vehicle to follow the determined path to the target location.

In an additional example a system is provided that includes a vehicle, a sensor connected to the vehicle, and a control system. The control system is configured to determine a target location for an object carried by the vehicle. The control system is also configured to determine a plurality of points defining a boundary of a volume to be occupied by the object at the target location. The plurality of points are scannable in a sequence by a sensor on the vehicle to produce a scan of the volume. The control system is additionally configured to determine a respective field of visibility to each respective point of the plurality of points. The control system is further configured to determine a path for the vehicle to follow to the target location, where the respective field of visibility intersects with a respective portion of the determined path such that each respective point of the plurality of points is observable by the sensor along at least a section of the respective portion of the determined path as the vehicle moves along the determined path to the target location. The control system is yet further configured to cause the vehicle to follow the determined path to the target location.

In a further example, a system is provided that includes means for determining a target location for an object carried by a vehicle. The system also includes means for determining a plurality of points defining a boundary of a volume to be occupied by the object at the target location. The plurality of points are scannable in a sequence by a sensor on the vehicle to produce a scan of the volume. The system additionally includes means for determining a respective field of visibility to each respective point of the plurality of points. The system further includes means for determining a path for the vehicle to follow to the target location, where the respective field of visibility intersects with a respective portion of the determined path such that each respective point of the plurality of points is observable by the sensor along at least a section of the respective portion of the determined path as the vehicle moves along the determined path to the target location. The system yet further includes means for causing the vehicle to follow the determined path to the target location.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 8A illustrates a point that is observable by a sensor from a portion of a vehicle path, according to an example embodiment.

FIG. 8B illustrates a point that is not observable by a sensor from another portion of the vehicle path, according to an example embodiment.

DETAILED DESCRIPTION

Figure 1:
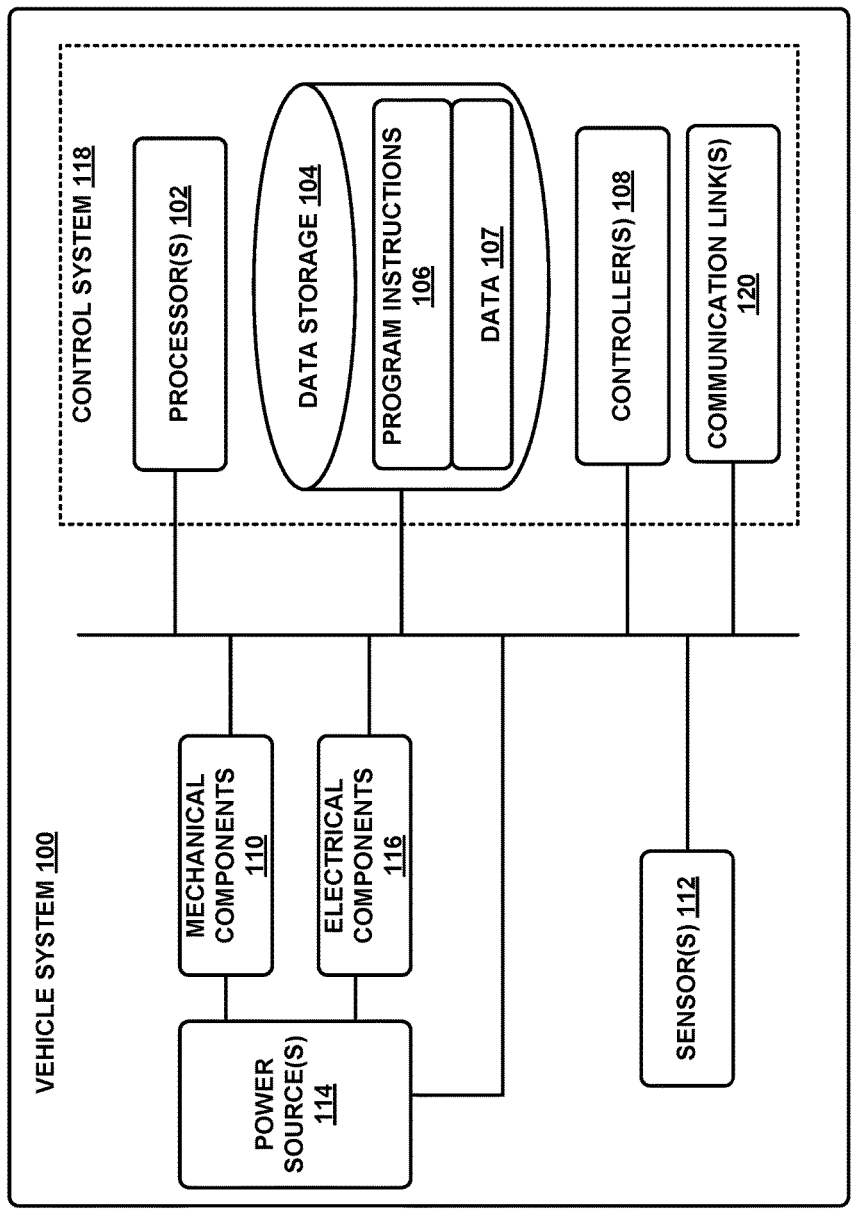
FIG. 1 illustrates a block diagram of a vehicle system, according to an example embodiment.

The following detailed description describes various features and operations of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, aspects of the present disclosure, as generally described herein and illustrated in the figures, can be arranged, substituted, combined, separated, and designed in a wide variety of different configurations.

In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein. Further, unless otherwise noted, figures are not drawn to scale and are used for illustrative purposes only. Moreover, the figures are representational only and not all components are shown. For example, additional structural or restraining components might not be shown.

I. OVERVIEW

An autonomous or semi-autonomous vehicle may be configured to move through an environment in order to accomplish different tasks within the environment. The different tasks may depend on the type of vehicle as well as the environment in which the vehicle is working. For example, the vehicle may be a forklift or a pallet jack working within a warehouse environment. Accordingly, the different tasks may include moving boxes, moving pallets of boxes or other objects, loading/unloading trucks, and/or loading/unloading storage shelves.

The vehicle may be equipped with a sensor such as a camera, stereo camera, depth sensor, LIDAR, Radar, and/or infrared sensor, among other possibilities. The sensor may be omnidirectional or, alternatively, the sensor may have a limited field of view. The sensor may be connected to the vehicle through a pan-head, one or more rotational joints, and/or one or more translational motion mechanisms to allow the sensor to rotate and/or translate with respect to the vehicle to control a portion of the environment within the field of view of the sensor and/or a perspective from which the sensor gathers data.

In some instances, the field of view of the sensor relative to the vehicle may be obstructed or otherwise limited. For example, when the vehicle is carrying an object such as a pallet or box, the object may wholly or partially obstruct the view of the sensor in a particular direction, thus creating a sensor blind spot. Even if the sensor can be rotated or translated, the object may be too large or may be too close to the sensor to permit a complete 360-degree view around the vehicle. In another example, one or more structural features of the vehicle may block the sensor view in a particular direction. In a further example, a sensor with a fixed or limited field of view may be connected to the vehicle in a fixed manner (e.g., no rotation or translation of the sensor relative to the vehicle may be possible). Accordingly, the portion of the environment observable by the sensor may depend on and/or be determined based on the position and orientation of the vehicle within the environment.

As the vehicle moves through an environment, the vehicle may scan one or more portions of the environment or objects located therein. When planning a path for the vehicle to follow through the environment to a target location such as, for example, a drop-off location for an object carried by the vehicle, the path planning operations may consider constraints imposed on the planned path by any sensor blind spots. Specifically, prior to moving into the target location, the vehicle may use the sensors to scan the target location to verify that the target location is free of obstacles and other hazards. For example, when the vehicle is dropping off an object at a drop-off location, the vehicle may scan the extent or volume of the drop-off location to verify that the drop-off location is free of other objects that the vehicle or object might collide with and/or that no humans are working or occupying the target location. Thus, given any sensor blind spots, the path planning operations may determine a path that allows the sensors on the vehicle to scan the entire extent or volume of the target location.

In an example embodiment, a control system of the vehicle may be configured to determine a target location for the vehicle and/or an object carried by the vehicle. In some examples, the target location may be a drop-off location for the object carried by the vehicle. The control system may also be configured to determine a plurality of points defining a boundary of a volume to be occupied by the object at the target location, The plurality of points may be scannable in a sequence by one or more sensors on the vehicle to produce a scan of the volume. The points may be, for example, vertices of a convex polygon or hull defining the area or volume to be occupied by the vehicle and/or the object (e.g., by defining an outer boundary of the area or volume). The points may be referred to as predetermined points or points of interest.

The control system of the vehicle may additionally determine a respective field of visibility to each respective point of the plurality of points. The respective field of visibility to the respective point may define an area or volume from within which the respective point may be observed. In other words, a sensor or observer located within the respective field of visibility may have a direct line of sight to the respective point.

The control system may further determine a path for the vehicle to follow to the target location. The determined path may allow the respective field of visibility to intersect with a respective portion of the determined path such that each respective point of the plurality of points is observable by at least one of the one or more sensors along at least a section of the respective portion of the determined path as the vehicle moves along the determined path to the target location. Specifically, an intersection between a respective field of visibility and the determined path may allow for a clear line of sight between the vehicle and the respective point when the vehicle is within the respective portion of the determined path that intersects with the respective field of visibility. When the sensor arrangement on the vehicle includes sensor blind spots, the determined path may be further verified to determine whether a direct line of sight exists between the sensor and the respective point.

In particular, projections of the vehicle and the viewable region of the sensor may be determined along one or more points along the portion of the determined path that intersects with the respective field of visibility. From the projections, the control system may determine whether a clear line of sight exists between the sensor and the respective point to allow the respective point to be scanned by the sensor. In some embodiments, the control system may further determine whether a scanning range (i.e., a radial extent of the viewable region of the sensor) is sufficient to scan the respective point from the determined path. If the control system determines that a particular point is not observable by the sensor at any section along the determined path, the path may be modified to allow the particular point to be observed by the sensor or another path may be selected for verification from a plurality of candidate path. When a vehicle path that allows all points to be scanned by the sensors is determined, the vehicle may be caused to follow the determined path to the target location.

In additional embodiments, a sensor trajectory may be determined for the sensor to follow as the vehicle moves along the determined path. The sensor trajectory may indicate a sequence in which to scan the points. Scanning the points in the sequence indicated by the sensor trajectory may allow the entire extent or volume of the target location to be scanned. In some examples, the sequence may be based serially on the spatial layout of the points in space, such that the points are scanned in order from one end of the space to another end of the space. In other examples, the sequence may be based on the order in which the points are observable as the vehicle moves along the determined path.

Further, the control system may keep a record of when the most recent scan of the target location took place (e.g., each point may be associated with a most recent scan time). When the amount of time elapsed since the most recent scan does not exceed a time threshold, the control system may determine to omit scanning the target location or specific points therein. Omitting to scan the target location might not pose a significant risk of collision since the amount of time elapsed may be small enough to determine, with high probability, that the state of the target location has not changed (e.g., the target location remains obstacle free). In contrast, when the amount of time elapsed exceeds the time threshold, the probability that the state of the target location has changed may be sufficiently high to warrant scanning the target location and/or points therein. The time threshold may be dynamically determined based on legal safety standards and/or a determination of whether another vehicle, robot, or human has occupied the target location since the most recent scan.

In some embodiments, the speed of the vehicle along the determined path may be modulated based on a distance between the target location and a current location of the vehicle. For example, when the vehicle is beyond a threshold distance from a drop-off location for an object carried by the vehicle, the vehicle may move at a high rate of speed. However, when the vehicle is within the threshold distance of the drop-off location and/or is dropping off the object at the drop-off location, the vehicle may move at a lower speed to ensure precise vehicle control and that, in the event of any collision, damage to the vehicle, the object carried by the vehicle, and/or the object the vehicle collides with is minimized. This approach may minimize the amount of time the vehicle spends operating at low speeds, thus increasing vehicle throughput without sacrificing safety of operation.

II. EXAMPLE VEHICLE SYSTEM

FIG. 1 illustrates an example configuration of a vehicle system that may be used in connection with the embodiments described herein. The vehicle system 100 may be configured to operate autonomously, semi-autonomously, and/or using directions provided by user(s). The vehicle system 100 may be implemented in various forms, such as forklifts, pallet jacks, cars, trucks, motorcycles, buses, boats, airplanes, helicopters, lawn mowers, earth movers, boats, snowmobiles, aircraft, recreational vehicles, amusement park vehicles, farm equipment, construction equipment, warehouse equipment, trams, golf carts, trains, and trolleys. Other forms are possible as well. Furthermore, the vehicle system 100 may also be referred to as a robot, robotic device, mobile robot, or robotic vehicle, among other designations.

As shown in FIG. 1, the vehicle system 100 may include processor(s) 102, data storage 104, and controller(s) 108, which together may be part of a control system 118. The vehicle system 100 may also include sensor(s) 112, power source(s) 114, mechanical components 110, electrical components 116, and communication link(s) 120. Nonetheless, the vehicle system 100 is shown for illustrative purposes, and may include more or fewer components. The various components of vehicle system 100 may be connected in any manner, including wired or wireless connections. Further, in some examples, components of the vehicle system 100 may be distributed among multiple physical entities rather than a single physical entity. Other example illustrations of vehicle system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the vehicle system 100, such as sensor(s) 112, power source(s) 114, mechanical components 110, electrical components 116, and/or communication link(s) 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, the communication link(s) 120, and/or a user of the vehicle system 100. In some embodiments, the controller 108 may be a purpose-built embedded device for performing specific operations with one or more sub systems of the vehicle system 100.

The control system 118 may monitor and physically change the operating conditions of the vehicle system 100. In doing so, the control system 118 may serve as a link between portions of the vehicle system 100, such as between mechanical components 110 and/or electrical components 116. In some instances, the control system 118 may serve as an interface between the vehicle system 100 and another computing device. Further, the control system 118 may serve as an interface between the vehicle system 100 and a user. For instance, the control system 118 may include various components for communicating with the vehicle system 100, including a joystick, buttons, and/or ports, etc. The example interfaces and communications noted above may be implemented via a wired or wireless connection, or both. The control system 118 may perform other operations for the vehicle system 100 as well.

In some implementations, the control system 118 of vehicle system 100 may also include communication link(s) 120 configured to send and/or receive information. The communication link(s) 120 may transmit data indicating the state of the various components of the vehicle system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the vehicle system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a piece of information (e.g. the operational state of one or more of the components of the vehicle system 100). The processor(s) 102 may subsequently transmit the piece of information back out the communication link(s) 120.

In some cases, the communication link(s) 120 may include a wired connection. The vehicle system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the vehicle system 100 via wired or wireless connections, and may further be configured to communicate with one or more users or operators of the vehicle. As one possible illustration, the control system 118 may receive an input (e.g., from a user or from another vehicle) indicating an instruction to move a pallet from a first location of a warehouse to a second location of the warehouse. The input to control system 118 may be received via the communication link(s) 120.

Based on this input, the control system 118 may perform operations to cause the vehicle system 100 to use sensors 112 to analyze the environment of the warehouse to locate the pallet and subsequently use mechanical components 110 to pick up and move the pallet.

Operations of the control system 118 may be carried out by the processor(s) 102. Alternatively, these operations may be carried out by the controller 108, or a combination of the processor(s) 102 and the controller 108. In some embodiments, the control system 118 may partially or wholly reside on a device other than the vehicle system 100, and therefore may at least in part control the vehicle system 100 remotely. Communication link(s) 120 may be used at least in part to carry out the remote communication.

Mechanical components 110 represent hardware of the vehicle system 100 that may enable the vehicle system 100 to perform physical operations. As a few examples, the vehicle system 100 may include physical members such robotic arm(s), wheel(s), track(s), linkage(s), and/or end effector(s). The physical members or other parts of vehicle system 100 may further include motors and actuators arranged to move the physical members in relation to one another. The vehicle system 100 may also include one or more structured bodies for housing the control system 118 and/or other components, and may further include other types of mechanical components. The mechanical components 110 used in a given robot may vary based on the design of the robot, and may also be based on the operations and/or tasks the robot may be configured to perform.

In some examples, the mechanical components 110 may include one or more removable components. The vehicle system 100 may be configured to add and/or remove such removable components, which may involve assistance from a user and/or another robot. For example, the vehicle system 100 may be configured with removable arms, linkages, and/or end effectors so that these members can be replaced or changed as needed or desired based on a task the vehicle 100 is expected or planned to perform. In some embodiments, the vehicle system 100 may include one or more removable and/or replaceable battery units or sensors. Other types of removable components may be included within some embodiments.

The vehicle system 100 may include sensor(s) 112 arranged to sense aspects of the vehicle system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras (e.g., a depth camera and/or a stereo camera), among other possibilities. Within some examples, the vehicle system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the vehicle system 100 with its environment, as well as monitoring of the operation of the vehicle system 100. The sensor data may be used in evaluation of various factors for activation, movement, and deactivation of mechanical components 110 and electrical components 116 by control system 118. For example, the sensor(s) 112 may capture data corresponding to the terrain of the environment, location and/or identity of nearby objects (e.g., pallets, environmental landmarks), which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the vehicle system 100 is operating. The sensor(s) 112 may monitor the environment in real time, and detect obstacles, elements of the terrain, weather conditions, temperature, and/or other aspects of the environment.

Further, the vehicle system 100 may include sensor(s) 112 configured to receive information indicative of the state of the vehicle system 100, including sensor(s) 112 that may monitor the state of the various components of the vehicle system 100. The sensor(s) 112 may measure activity of systems of the vehicle system 100 and receive information based on the operation of the various features of the vehicle system 100, such the operation of wheels, linkages, actuators, end effectors, and/or other mechanical and/or electrical features of the vehicle system 100. The data provided by the sensor(s) 112 may enable the control system 118 to determine errors in operation as well as monitor overall operation of components of the vehicle system 100.

As an example, the vehicle system 100 may use a stereo camera to scan portions of the environment to detect obstacles along a planned path of the vehicle, identify environmental landmarks within an environment of the vehicle 100, and locate objects of interest, such as pallets and boxes. The stereo camera may have a limited field of view. Mechanical components 110 and electrical components 116 may work in coordination to move the stereo camera along a trajectory to direct a field of view of the stereo camera at different portions of the environment.

As another example, the sensor(s) 112 may include one or more velocity and/or acceleration sensors. The sensor(s) 112 may measure both linear and angular velocity and/or acceleration. For instance, the sensor(s) 112 may include an inertial measurement unit (IMU) having a 3-axis accelerometer, a 3-axis gyroscope, and a 3-axis magnetometer. The IMU may sense velocity and acceleration in the world frame, with respect to the gravity vector. The velocity and acceleration sensed by the IMU may then be translated to that of the vehicle system 100 based on the location of the IMU in the vehicle system 100 and the kinematics of the vehicle system 100.

The vehicle system 100 may include other types of sensors not explicated discussed herein. Additionally or alternatively, the vehicle system 100 may use particular sensors for purposes not enumerated herein.

The vehicle system 100 may also include one or more power source(s) 114 configured to supply power to various components of the vehicle system 100. Among other possible power systems, the vehicle system 100 may include a hydraulic system, electrical system, batteries, and/or other types of power systems. As an example illustration, the vehicle system 100 may include one or more batteries configured to provide charge to components of the vehicle system 100. Some of the mechanical components 110 and/or electrical components 116 may each connect to a different power source, may be powered by the same power source, or be powered by multiple power sources.

Any type of power source may be used to power the vehicle system 100, such as electrical power or a gasoline engine. Additionally or alternatively, the vehicle system 100 may include a hydraulic system configured to provide power to the mechanical components 110 using fluid power. Components of the vehicle system 100 may operate based on hydraulic fluid being transmitted throughout the hydraulic system to various hydraulic motors and hydraulic cylinders, for example. In one example, the hydraulic fluid may be used to actuate the forks of a forklift, fork truck, and/or pallet jack. The hydraulic system may transfer hydraulic power by way of pressurized hydraulic fluid through tubes, flexible hoses, or other links between components of the vehicle system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the vehicle system 100. The electrical components 116 may interwork with the mechanical components 110 to enable the vehicle system 100 to perform various operations. The electrical components 116 may be configured to provide power from the power source(s) 114 to the various mechanical components 110, for example. Further, the vehicle system 100 may include electric motors. Other examples of electrical components 116 may exist as well.

Although not shown in FIG. 1, the vehicle system 100 may include a chassis and/or an operator cabin, which may connect to or house components of the vehicle system 100. The structure of the chassis and/or cabin may vary within examples and may further depend on operations that a given vehicle may have been designed to perform. For example, a vehicle developed to carry large, heavy loads may have a wide, rigid chassis that enables placement of the load. Similarly, a vehicle designed to carry light loads at high speeds may have a narrow, small chassis that does not have substantial weight. Further, the chassis, cabin, and/or the other components may be developed using various types of materials, such as metals or plastics. Within other examples, a vehicle may have a chassis with a different structure or made of various types of materials.

The chassis, cabin, and/or the other components may include or carry the sensor(s) 112. These sensors may be positioned in various locations on the vehicle system 100, such as on top of the chassis to provide a high vantage point for the sensor(s) 112.

The vehicle system 100 may carry a load, such as a type of cargo that is to be transported. The load may also represent external batteries or other types of power sources (e.g., solar panels) that the vehicle system 100 may utilize. Carrying the load represents one example use for which the vehicle system 100 may be configured, but the vehicle system 100 may be configured to perform other operations as well.

III. EXAMPLE WAREHOUSE VEHICLE FLEET

Figure 2A:
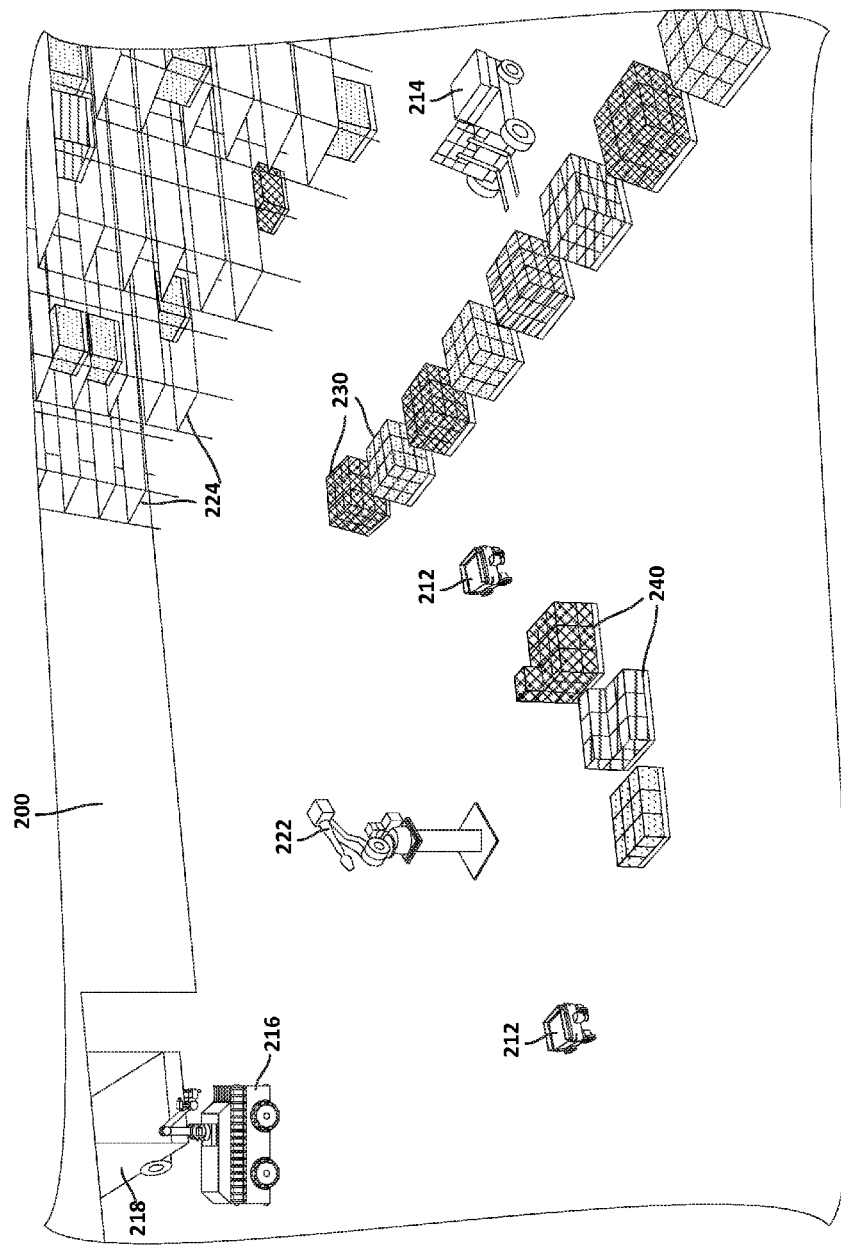
FIG. 2A illustrates a robotic fleet, according to an example embodiment.

FIG. 2A depicts a fleet of vehicles and robotic devices within a warehouse setting, according to an example embodiment. More specifically, different types of vehicles and robotic devices may form a heterogeneous robotic vehicle fleet 200 that may be controlled to collaborate to perform tasks related to the processing of items, objects, or boxes within a warehouse environment. Certain example types and numbers of different vehicles and robotic devices are shown here for illustration purposes, but robotic vehicle fleet 200 may employ more or fewer vehicles and robotic devices, may omit certain types shown here, and may also include other types of vehicles and robotic devices not explicitly shown. The operations described herein may be performed by or for any of the vehicles shown or otherwise contemplated herein. Additionally, a warehouse environment is shown here with certain types of fixed components and structures, but other types, numbers, and placements of fixed components and structures may be used in other examples as well.

One example type of vehicle shown within robotic vehicle fleet 200 is an autonomous guided vehicle (AGV) 212, which may be a relatively small, vehicle with wheels that may function to transport individual packages, cases, or totes from one location to another within the warehouse. Another example type of vehicle is an autonomous fork truck 214, a mobile device with a forklift that may be used to transport pallets of boxes and/or to lift pallets of boxes (e.g., to place the pallets onto a rack for storage). An additional example type of a robotic vehicle/device is a robotic truck loader/unloader 216, a mobile device with a robotic manipulator as well as other components such as sensors to facilitate loading and/or unloading boxes onto and/or off of trucks or other vehicles. For instance, robotic truck unloader 216 may be used to load boxes onto delivery truck 218, which may be parked adjacent to the warehouse. In some examples, movements of delivery truck 218 (e.g., to deliver packages to another warehouse) may also be coordinated with robotic devices within the fleet.

Other types of vehicles and mobile robotic devices than those illustrated here may also be included as well or instead. For example, the vehicle fleet 200 may include variations of fork truck 214 such as a pallet jack and/or a fork truck/pallet jack hybrid. In some examples, one or more vehicles and/or robotic devices may use different modes of transportation besides wheels on the ground. For instance, one or more robotic vehicles/devices may be airborne (e.g., quadcopters), and may be used for tasks such as moving objects or collecting sensor data of the environment.

In further examples, the robotic fleet 200 may also include various fixed components that may be positioned within the warehouse. In some examples, one or more fixed robotic devices may be used to move or otherwise process items. For instance, a pedestal robot 222 may include a robotic arm elevated on a pedestal that is fixed to the ground floor within the warehouse. The pedestal robot 222 may be controlled to distribute boxes between other robots and vehicles and/or to stack and unstack pallets of items. For example, the pedestal robot 222 may pick up and move boxes from nearby pallets 240 and distribute the boxes to individual AGV's 212 for transportation to other locations within the warehouse.

In additional examples, robotic fleet 200 may employ additional fixed components positioned within a warehouse space. For instance, storage racks 224 may be used to store pallets and/or objects within the warehouse. The storage racks 224 may be designed and positioned to facilitate interaction with one or more vehicles and/or robotic devices within the fleet, such as autonomous fork truck 214. In further examples, certain ground space may be selected and used for storage of pallets or boxes as well or instead. For instance, pallets 230 may be positioned within the warehouse environment at chosen locations for certain periods of time to allow the pallets to be picked up, distributed, or otherwise processed by one or more of the vehicles and/or robotic devices.

Figure 2B:
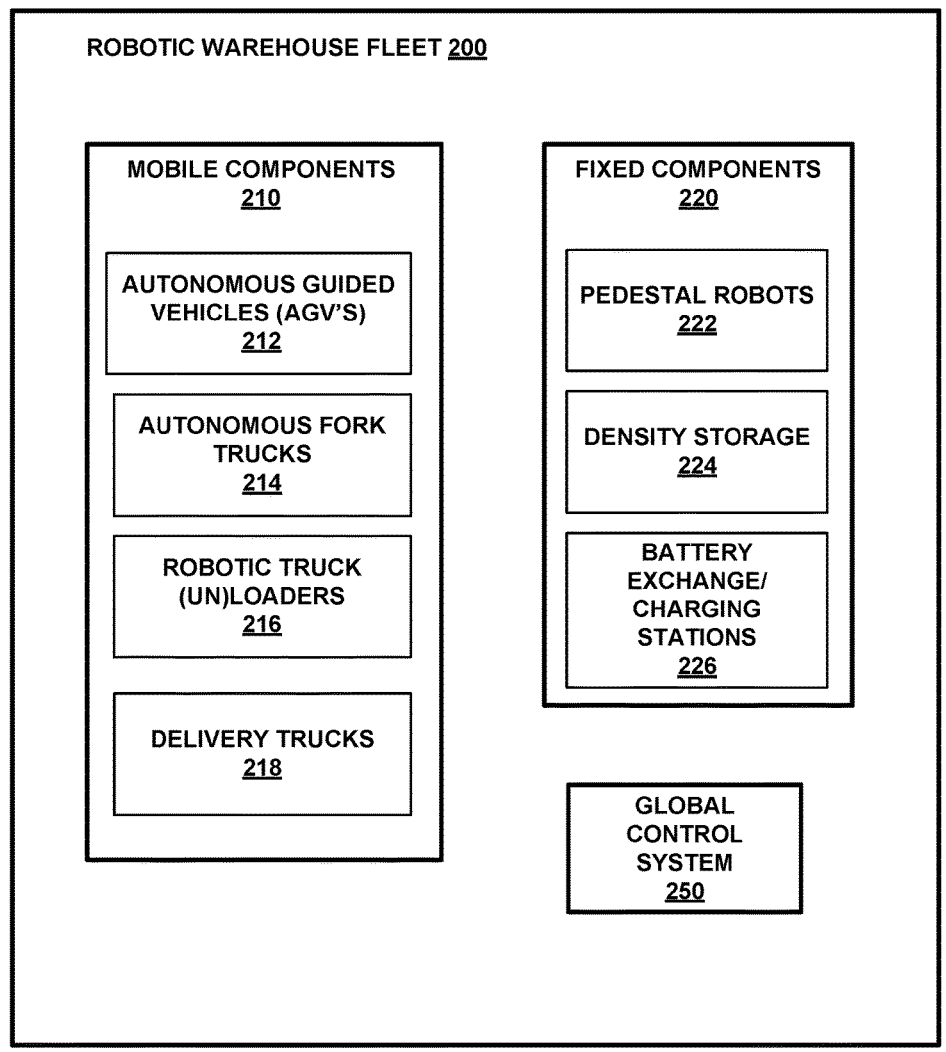
FIG. 2B illustrates a functional block diagram of components of a robotic fleet, according to an example embodiment.

FIG. 2B is a functional block diagram illustrating components of a robotic warehouse fleet 200, according to an example embodiment. The robotic fleet 200 could include one or more of various mobile components, such as AGV's 212, autonomous fork trucks 214, robotic truck loaders/unloaders 216, and delivery trucks 218. The robotic fleet 200 may additionally include one or more fixed components positioned within a warehouse or other environment, such as pedestal robots 222, density storage containers 224, and battery exchange/charging stations 226. In further examples, different numbers and types of the components illustrated within FIG. 2B may be included within a fleet, certain types may be omitted, and additional functional and/or physical components may be added to the examples illustrated by FIGS. 2A and 2B as well. To coordinate actions of separate components, a global control system 250, such as a remote, cloud-based server system, may communicate (e.g., through wireless communication) with some or all of the system components and/or with separate local control systems of individual components.

In some examples, global control system 250 may include a central planning system that assigns tasks to different robotic devices within fleet 200. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 250 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally. In another example, the global planner may provide the vehicles and robotic devices with predetermined paths. The vehicles and robotic device may control a speed along the predetermined paths and may modify the predetermined paths based on local sensor data.

In additional examples, a central planning system may be used in conjunction with local vision on individual vehicles and/or robotic devices to coordinate functions of robots within robotic vehicle fleet 200. For instance, a central planning system may be used to get the vehicles and/or robots relatively close to where they need to go. However, it may be difficult for the central planning system to command vehicles and/or robots with millimeter precision, unless the vehicles/robots are bolted to rails or other measured components are used to precisely control vehicle/robot positions. Local vision and planning for individual vehicles and/or robotic devices may therefore be used to allow for elasticity between different vehicles and/or robotic devices. A general planner may be used to get a vehicle/robot close to a target location, at which point local vision of the vehicle/robot may take over. In some examples, most vehicle/robotic functions may be position-controlled to get the vehicles/robots relatively close to target locations, and then vision and handshakes may be used when needed for local control.

In further examples, visual handshakes may enable two vehicles/robots to identify one another by AR tag or other characteristics, and to perform collaborative operations within fleet 100. In additional examples, items (e.g., packages to be shipped) may be provided with visual tags as well or instead, which may be used by the vehicles and/or robotic devices to perform operations on the items using local vision control. In particular, the tags may be used to facilitate manipulation of the items by the vehicles and/or robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual vehicles/robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic vehicle fleets and/or traditional warehouses. For instance, global control system 250 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 200 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out). The map may be used to determine paths for the vehicles and robotic devices to follow in order to traverse the environment of the warehouse.

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by vehicles and robots. A potential benefit may be added transparency, both on the supplier side and the consumer side. On the supplier side, information about current locations of inventory may be used to avoid overstocking and/or to move items or pallets of items to different locations or warehouses to anticipate demand. On the consumer side, the information about current locations of items may be used to determine when a package will be delivered with improved accuracy.

In some examples, some or all of the mobile components 210 within robotic fleet 200 may periodically receive charged batteries from a battery exchange station 226 equipped with multiple battery chargers. In particular, the station 226 may replace a mobile robot's old batteries with recharged batteries, which may prevent robots from having to sit and wait for batteries to charge. The battery exchange station 226 may be equipped with a robotic manipulator such as a robotic arm. The robotic manipulator may remove batteries from an individual mobile robot and attach the batteries to available battery chargers. The robotic manipulator may then move charged batteries located at the station 226 into the mobile robot to replace the removed batteries. For instance, an AGV 212 with a weak battery may be controlled to move over to battery exchange station 226 where a robotic arm pulls a battery out from the AGV 212, puts the battery in a charger, and gives the AGV 212 a fresh battery.

Figure 3A:
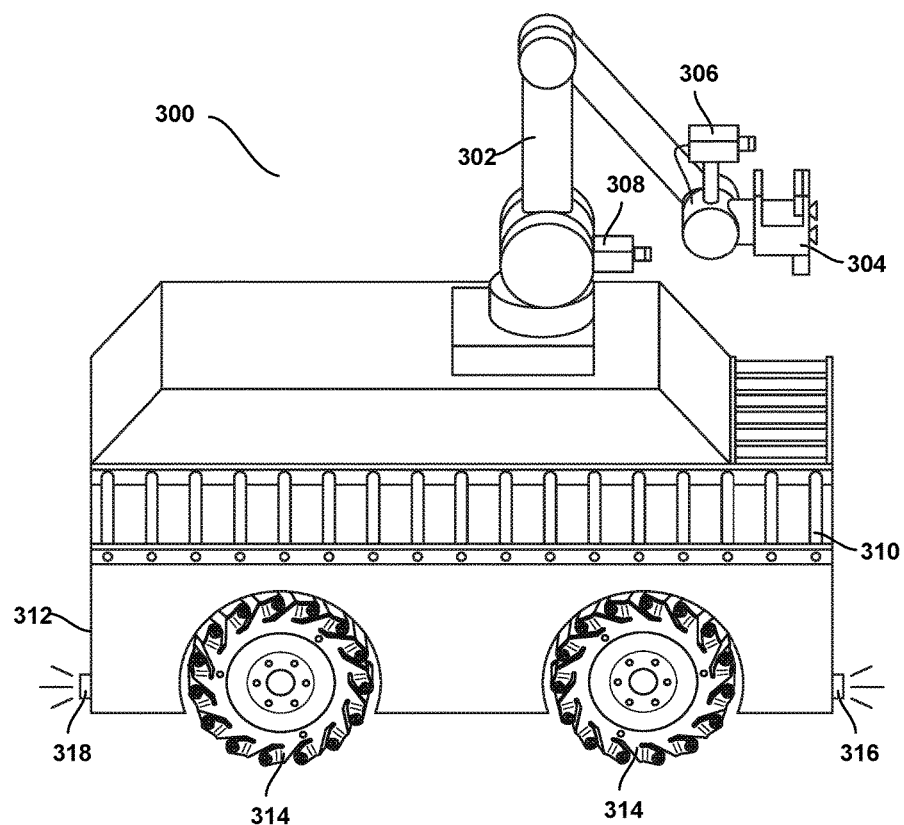
FIG. 3A illustrates a robotic truck unloader, according to an example embodiment.
Figure 3B:
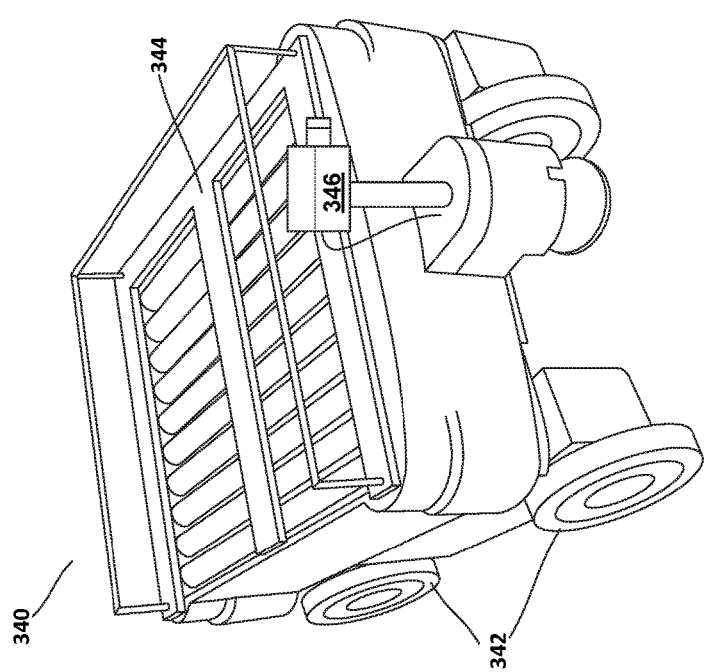
FIG. 3B illustrates an autonomous guided vehicle, according to an example embodiment.
Figure 3C:
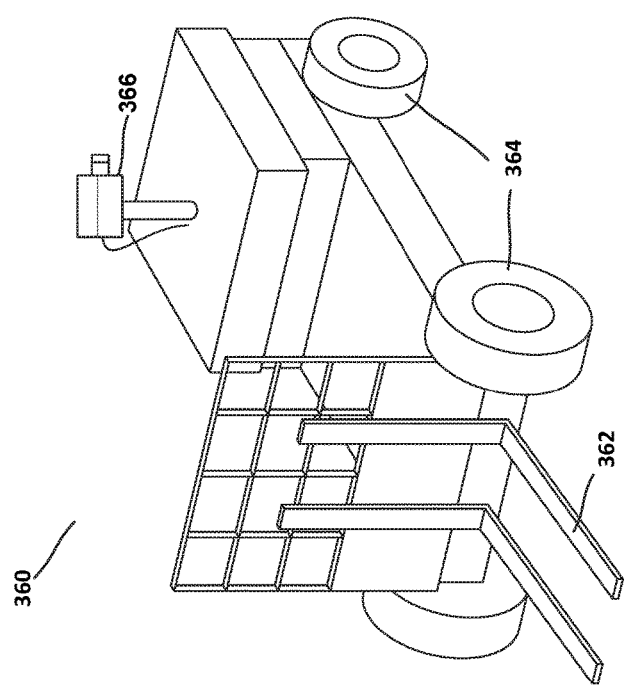
FIG. 3C illustrates an autonomous fork truck, according to an example embodiment.

FIGS. 3A-3C illustrate several examples of vehicles that may be included within a robotic vehicle warehouse fleet. Other robotic devices which vary in form from those illustrated here as well as other types of robotic devices may also be included.

FIG. 3A illustrates a robotic truck unloader 300, according to an example embodiment. Robotic truck unloader 300 may be an example of vehicle system 100, as illustrated in FIG. 1. In some examples, a robotic truck unloader may include one or more sensors, one or more computers, and one or more robotic arms. The sensors may move along a sensor trajectory to scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 300 may include a robotic arm 302 with a gripping component 304 for gripping objects within the environment. The robotic arm 302 may use the gripping component 304 to pick up and place boxes to load or unload trucks or other containers. The truck unloader 300 may also include a moveable cart 312 with wheels 314 for locomotion. The wheels 314 may be holonomic wheels that allow the cart 312 to move with two degrees of freedom. Additionally, a wrap around front conveyor belt 310 may be included on the holonomic cart 312. In some examples, the wrap around front conveyer belt may allow the truck loader 300 to unload or load boxes from or to a truck container or pallet without having to rotate gripper 304.

In further examples, a sensing system of robotic truck unloader 300 may use one or more sensors attached to a robotic arm 302, such as sensor 306 and sensor 308, which may be two-dimensional (2D) sensors and/or 3D depth sensors that sense information about the environment as the robotic arm 302 moves. Robotic arm 302 may be controlled to move sensor 306 to control a portion of the environment observable by the sensor 306.

The sensing system may determine information about the environment that can be used by a control system (e.g., a computer running motion planning software) to pick and move boxes efficiently. The control system could be located on the device or could be in remote communication with the device. In further examples, scans from one or more 2D or 3D sensors with fixed mounts on a mobile base, such as a front navigation sensor 316 and a rear navigation sensor 318, and one or more sensors mounted on a robotic arm, such as sensor 306 and sensor 308, may be integrated to build up a digital model of the environment, including the sides, floor, ceiling, and/or front wall of a truck or other container. Using this information, the control system may cause the mobile base to navigate into a position for unloading or loading.

In further examples, the robotic arm 302 may be equipped with a gripper 304, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 300 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

FIG. 3B shows an autonomous guided vehicle (AGV), according to an example embodiment. More specifically, AGV 340 may be a relatively small, mobile robotic device that is capable of transporting individual boxes or cases. The AGV 340 may include wheels 342 to allow for locomotion within a warehouse environment. Additionally, a top surface 344 of the AGV 340 may be used to places boxes or other objects for transport. In some examples, the top surface 344 may include rotating conveyors to move objects to or from the AGV 340. The AGV 340 may include sensor 346 (e.g., stereo camera) connected to AGV 340 and configured to move with respect to the AGV 340 to observe different portions of the environment (e.g., rotate and/or translate with respect to the AGV 340). Sensor 346 may be used in obstacle detection, vehicle localization, and pallet/object detection, among other tasks. In some example implementations, sensor 364 may be connected to a different portion of AGV 340 than shown in FIG. 3B.

In additional examples, the AGV 340 may be powered by one or more batteries that can be quickly recharged at a battery charging station and/or exchanged for fresh batteries at a battery exchange station. In further examples, the AGV 340 may additionally include other components not specifically identified here, such as sensors for navigation. AGVs with different shapes and sizes also may be included within a robotic warehouse fleet, possibly depending on the types of packages handled by a warehouse.

FIG. 3C shows an autonomous fork truck, according to an example embodiment. More specifically, autonomous fork truck 360 may include a forklift 362 for lifting and/or moving pallets of boxes or other larger materials. In some examples, the forklift 362 may be elevated to reach different racks of a storage rack or other fixed storage structure within a warehouse. The autonomous fork truck 360 may additionally include wheels 364 for locomotion to transport pallets within the warehouse. In additional examples, the autonomous fork truck may include a motor and power supply as well as a sensing system, such as those described with respect to robotic truck unloader 300. For example, autonomous fork truck 360 may include sensor 366 (e.g., stereo camera) configured to move (e.g., rotate and/or translate) with respect to the autonomous fork truck 360 to observe different portions of the environment. The sensor 366 may be connected to a different portion of autonomous fork truck 360 than shown in FIG. 3C. The autonomous fork truck 360 may also vary in size or shape from the one illustrated in FIG. 3C.

Any of the robotic devices described herein may include one or more sensor(s) such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, audio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) may provide sensor data to a processor(s) to allow for appropriate interaction of a robotic device with the environment. Additionally, a robotic device may also include one or more power source(s) configured to supply power to various components of the robotic device. Any type of power source may be used such as, for example, a gasoline engine or a battery.

IV. EXAMPLE VEHICLE AND SENSOR SYSTEMS

The autonomous vehicles described and illustrated herein (e.g., robotic truck unloader 300, AGV 340, and fork truck 360) as well as other similar vehicles and robotic devices (e.g., autonomous pallet jack) may be used to perform a plurality of tasks in a warehouse or similar setting. For example, the vehicles may be used for receiving objects, storing objects, retrieving objects from storage, transporting objects, delivering objects from the warehouse, or otherwise processing objects in a warehouse of similar setting. The vehicles may move to particular areas of the warehouse or storage facility to pick up boxes for transport to another location. The vehicles may construct or deconstruct pallets of boxes and/or open boxes to manipulate items within the boxes.

Some or all of the autonomous vehicles may be equipped with one or more sensors. In some embodiments, the one or more sensors may have a limited field of view. In other embodiments, the one or more sensors may be omnidirectional (i.e., capable of sensing a 360-degree view). Within examples, a field of view may include an angular expanse (i.e., an angle of view) and a radial expanse (i.e., a range limit) defining an area or volume visible to the sensor at a given time. An omnidirectional sensor (i.e., a sensor without a limited field of view) may be able to observe a 360-degree angular expanse around the sensor without needing to rotate the sensor. In contrast, a sensor with a limited field of view might be able to only observe a portion of the 360-degree angular expanse around the sensor. Accordingly, the sensor may need to be rotated or moved to observe the 360-degree angular expanse around the sensor. In one example, the limited field of view may comprise a 45-degree angular expanse visible to the sensor at a given time. Thus, only one eighth of the 360-degree angular expanse around the sensor may be observable by the sensor at a given time (i.e., be within the field of view of the sensor).

Figure 4A:
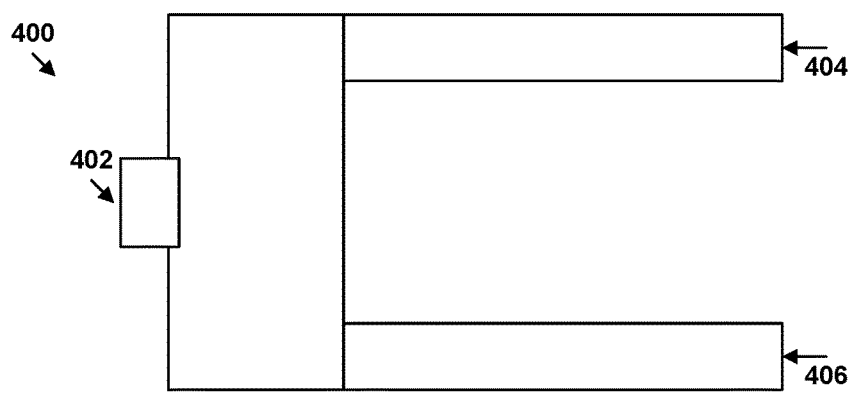
FIG. 4A illustrates a top view of an autonomous pallet jack, according to an example embodiment.

FIG. 4A illustrates an example vehicle in the form of autonomous pallet jack 400. Specifically, FIG. 4A illustrates a top view of pallet jack 400. Pallet jack 400 may include forks 404 and 406 for picking up and moving pallets. Forks 404 and 406 may be inserted into one or more corresponding holes on the pallet. Forks 404 and 406 may then be lifted to pick up the pallet for transport. Pallet jack 400 may additionally include sensor 402. Sensor 402 may be an omnidirectional sensor or a sensor having a limited field of view, as discussed above.

Figure 4B:
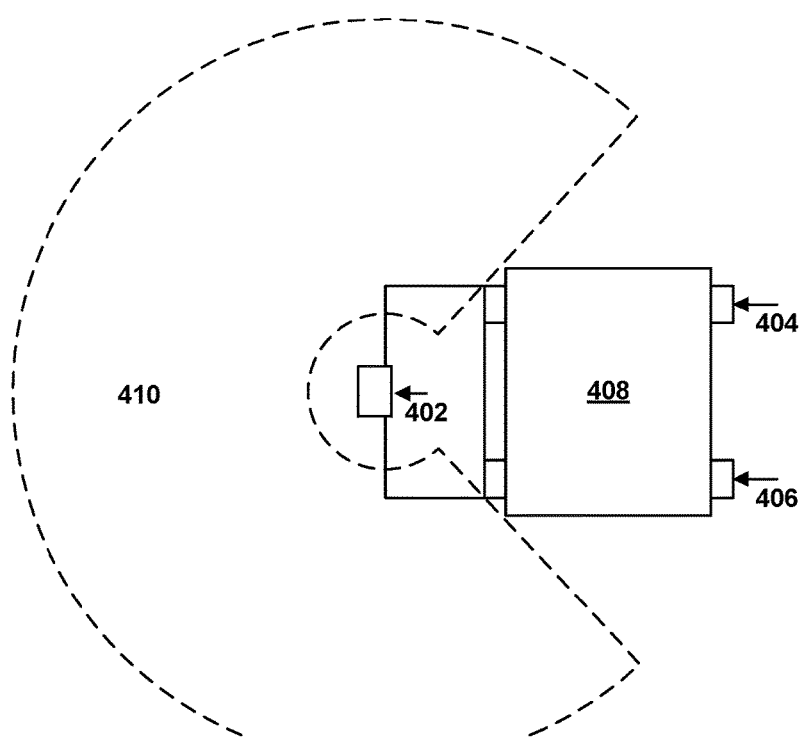
FIG. 4B illustrates a viewable region of a sensor on a pallet jack, according to an example embodiment.

FIG. 4B illustrates a top view of pallet jack 400 carrying an object 408 (e.g., a pallet). When pallet jack 400 is carrying object 408, object 408 may obstruct certain portions of an environment from the field of view of sensor 402. Sensor 402 may be limited, due to object 408, to sensing portions of the environment within the viewable region 410. When sensor 402 is omnidirectional, the entirety of viewable region 410 may be scanned by sensor 402 simultaneously. When sensor 402 has a limited field of view, sensor 402 may be rotated and/or translated to observe the entirety of viewable region 410.

In some instances, object 408, when carried by pallet jack 400, may exceed a height at which sensor 402 is positioned. Thus, the region to the right of object 408, as shown in FIG. 4B, may be obstructed by object 408 from the view of sensor 402. In some embodiments, sensor 402 may be translatable (e.g., up and down) to allow sensor 408 to see past object 408. Even so, a portion of the environment directly to the right of object 408 might not be observable by the sensor 402 due to object 408. The portion of the field of view of sensor 402 obstructed by object 408 may be referred to as a sensor blind spot.

In general, sensor blind spot may be caused by conditions other than obstruction of sensor 402 by object 408. For example, sensor blind spot may result from a limited range of motion of the sensor with respect to the vehicle and may be determined by a mechanism mounting the sensor to the vehicle (e.g., the mechanism might not provide for rotation or translation of the sensor). Alternatively or additionally, sensor blind spot may result from portions of the vehicle obstructing the field of view of the sensor. Other causes of sensor blind spot may be possible. Accordingly, within examples, a sensor blind spot of a sensor connected to a vehicle may be an area or volume, defined relative to the vehicle, that is obstructed or excluded from the view of the sensor by portions of the vehicle, objects carried by the vehicle, and/or a mechanism connecting the sensor to the vehicle and defining the range of motion of the sensor relative to the vehicle. Sensor blind spot may be considered when planning a path for the vehicle to follow and/or when planning a sensor trajectory along which to move the sensor to scan points of interest within the environment as the vehicle moves along the planned path.

V. EXAMPLE PATH PLANNING OPERATIONS

Figure 5:
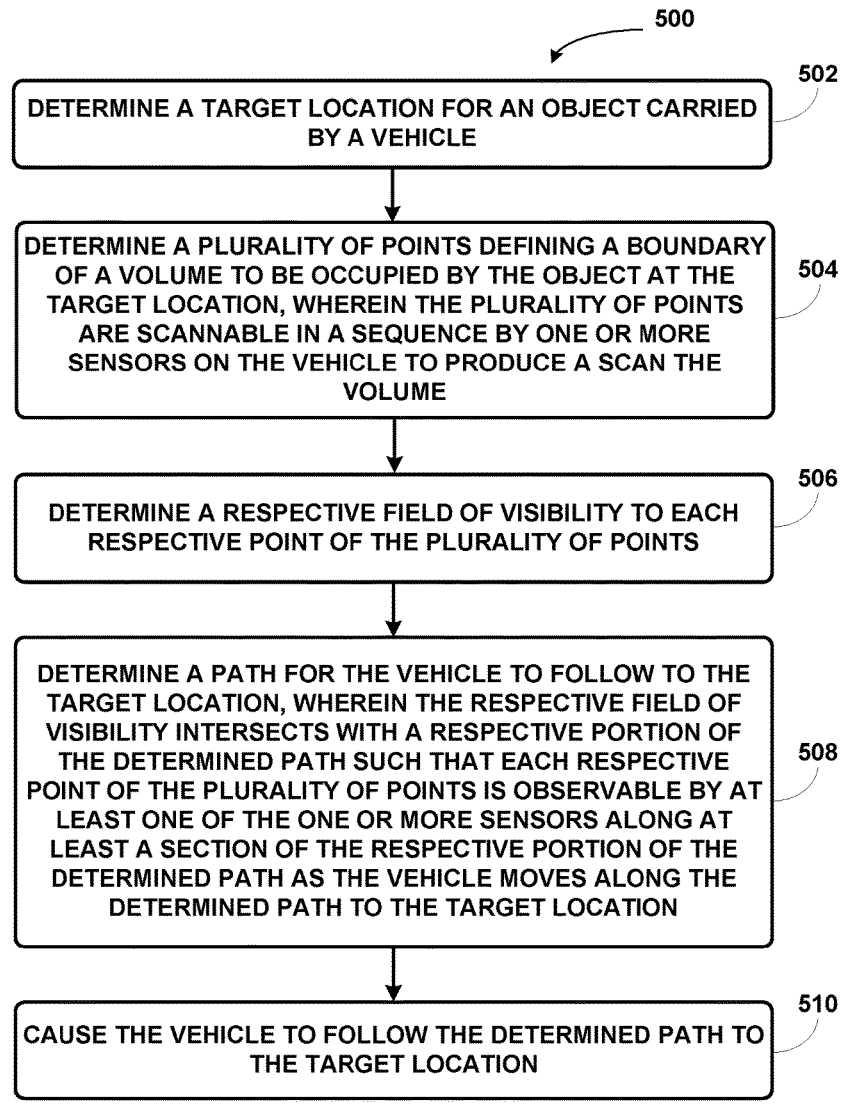
FIG. 5 illustrates a flow diagram of example operations, according to an example embodiment.

FIG. 5 illustrates example operations for planning a path for a vehicle to follow to a target location for the vehicle and/or an object carried by the vehicle. The operations of flow diagram 500 may result in a vehicle path that allows sensors connected to the vehicle to scan the target location prior to moving the vehicle and/or the object into the target location. The operations of flow diagram 500 may be carried out by, for example, a control system of the vehicle. Alternatively, the operations may be carried out by a global control system remote to the vehicle. The global control system may be programmed to synchronize operations of multiple vehicles. Specifically, the global control system may be programmed to perform the operations of flow diagram 500 for multiple vehicles at a time to prevent collisions between vehicles operating in the same environment.

In block 502 of flow diagram 500, a target location may be determined for an object carried by a vehicle. The vehicle may be, for example, robotic truck unloader 300, AGV 340, fork truck 360, and/or pallet jack 400, among other possible vehicles. The object may be, for example, a pallet, box, barrel, or storage container. Other types of objects not limited to units of storage are possible. The target location may be, for example, a drop-off location for the object. The drop-off location may be, for example, a storage shelf, a pallet rack, or an area within an environment designated for receiving and/or storing the object. Within examples, the target location may be a location within an environment of the vehicle to be occupied by the vehicle and/or the object carried by the vehicle. The drop-off location may be scanned by sensors on the vehicle prior to the object and/or the vehicle entering the drop-off location.

In block 504, a plurality of points may be determined within the target location. The plurality of points may define a boundary of a volume to be occupied by the object at the target location. The plurality of points may be scannable in a sequence by one or more sensors on the vehicle to produce a scan the volume to be occupied by the object at the target location. By scanning the plurality of points in a sequence, the one or more sensors on the vehicle may scan the entire volume to be occupied by the object at the target location. The sequence of points may be determined to ensure that the entire extent of the volume to be occupied by the object at the target location is scanned.

The one or more sensors may include any types of sensors configured for sensing features and objects within the environment of the vehicle. The plurality of points may be vertices of a convex hull defining a boundary of the volume to be occupied by the object at the target location. The volume to be occupied by the object may correspond to the actual volume predicted to be occupied by the object and may correspond to actual dimensions of the object. Alternatively, the volume to be occupied by the object may include a margin of error above the actual volume and dimensions of the object to account for uncertainty in the dimensions of the object, sensor error, vehicle positioning error, etc. (e.g., the predicted volume may be 10% greater than the actual volume of the object).

In block 506, a respective field of visibility to each respective point of the plurality of points may be determined. The respective field of visibility to the respective point may define a two-dimensional (2D) or three-dimensional (3D) extent of the environment from within which the respective point may be observable. For example, a sensor placed within the respective field of visibility of the respective point may scan the point as well as portions of the environment surrounding the point.

In block 508, a path may be determined for the vehicle to follow to the target location. The respective field of visibility may intersect with a respective portion of the determined path such that each respective point of the plurality of points is observable by at least one of the one or more sensors along at least a section of the respective portion of the determined path as the vehicle moves along the determined path to the target location. Specifically, a respective point of the plurality of points may be observable by at least one sensor when the vehicle is within the section of the respective portion of the path that intersects with the respective field of visibility. The respective portion of the path may be a subset of the entire determined path. Similarly, the section of the respective portion of the path may be a subset of the respective portion of the path. Alternatively, in some embodiments, a point may be observable along the entire respective portion of the path and/or along the entire path.

In some embodiments, the determined path may be selected from among a plurality of candidate paths. A candidate path may be evaluated by determining whether each respective field of visibility intersects with at least a portion of the candidate path. Further, the candidate path may be evaluated by determining, for each respective point, whether, given any blind spots of the one or more sensors, the respective point is observable by the one or more sensors when the vehicle is at the portion of the candidate path intersecting with the respective field of visibility corresponding to the respective point. A candidate path satisfying these conditions may be selected as the path for the vehicle to follow to the drop-off location.

In other embodiments, the control system of the vehicle may receive, from the global positioning system, a nominal path to follow. Determining the path for the vehicle to follow to the target location may include verifying and/or validating that each respective point of the plurality of points is observable from at least a respective portion of the nominal path. In particular, the verification may determine that each respective point of the plurality of points is observable by the one or more sensors as the vehicle moves along the nominal path (i.e., no modifications to the nominal path may be needed).

Alternatively, the verification may determine that each respective point of the plurality of points is not observable by the one or more sensors as the vehicle moves along the nominal path. Thus, the control system may modify the nominal path to ensure that each respective point of the plurality of points is observable by the one or more sensors along at least a respective portion of the modified nominal path. In some embodiments, the control system may modify the nominal path to ensure that each point is observable along a section of the modified path, where the section is of at least a minimum length. The nominal path may be modified by lengthening the path, shifting the path, and/or including additional vehicle maneuvers along the path. The modified path may be verified to determine whether the path satisfies the conditions described above with reference to candidate paths.

In further embodiments, the path for the vehicle to follow may be determined by the control system from scratch, without relying on any previously determined candidate paths or nominal paths. Specifically, the path may be determined based on the constraints of (i) the respective fields of visibility to each of the points, (ii) any sensor blind spots, (iii) any physical features of the environment defining regions that the vehicle can freely traverse, and (iv) current and planned locations of other vehicles and/or robotic devices operating within the environment (e.g., based on lanes of traffic reserved for the other vehicles/robots and/or based on planned paths of the other vehicles/robots).

In block 510, the vehicle may be caused to follow the determined path to the target location. As the vehicle follows the path to the target location, the one or more sensors may be used to scan each of the plurality of points. Thus, the volume to be occupied by the object at the drop-off location may be scanned before the object is placed at the drop-off location to ensure that the drop-off location is free of obstacles.

VI. EXAMPLE OPERATIONS FOR DETERMINING FIELDS OF VISIBILITY

Figure 6A:
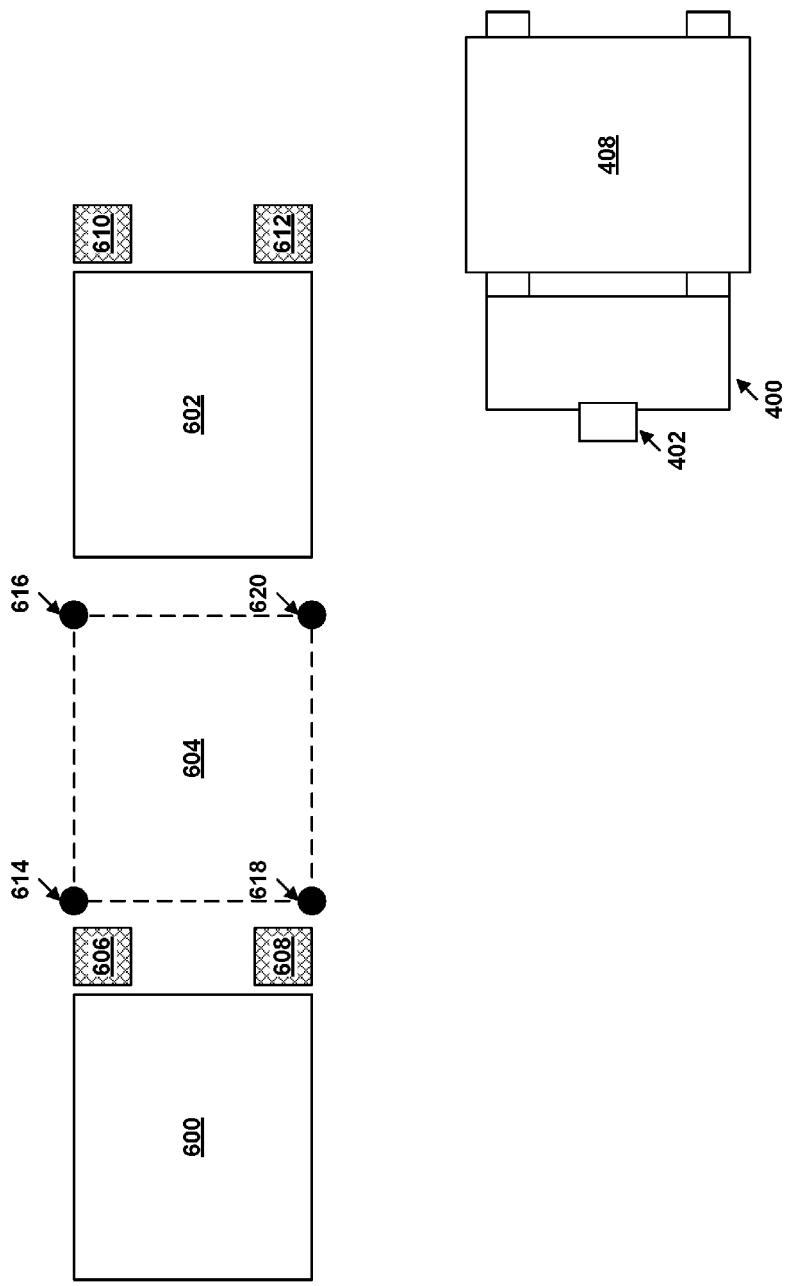
FIG. 6A illustrates points in a target location for an object, according to an example embodiment.

FIGS. 6A, 6B, 6C, 6D, 6E, 6F, and 6G illustrate an example embodiment performing the operations of flow diagram 500 of FIG. 5. Specifically, FIG. 6A illustrates pallet jack 400 carrying object 408. Pallet jack 402 includes a sensor 402 that may have a sensor blind spot due to, for example, the size of object 408 and/or the proximity of object 408 to sensor 402. Pallet jack 400 may be planned to drop off object 408 at target location 604. Target location 604 may be a pallet rack in a warehouse and may be refereed to as a drop-off location for the object. The pallet rack may include support columns 606, 608, 610, and 612 for supporting the racks of the pallet rack. A first pallet 600 may be located to the left of drop-off location 604 and a second pallet 602 may be located to the right of drop-off location 604.

The control system of the vehicle may have a map of the environment based on which the vehicle may determine the locations of pallets 600 and 602 as well as support columns 606-612. The map of the environment may have been generated based on prior scans of the environment by sensor 402 of pallet jack 400 as well as other sensors on other vehicles operating alongside pallet jack 400. Although a map of the environment may be available, pallet jack 400 may be configured to scan the drop-off area 604 prior to placing object 408 at the drop-off area to ensure that no obstacles (e.g., other objects) or hazards (e.g., humans occupying drop-off location 604) are present at the drop-off location 604. Specifically, the scan may ensure that the portion of the map of the environment representing drop-off location 604 is refreshed and reflects any changes in the occupancy of drop-off location 604 occurring since the most recent scan of drop-off location 604.

In order to scan drop-off location 604, a plurality of points 614, 616, 618, and 620 may be determined within the drop-off location 604. Points 614-620 may be referred to as predetermined points or points of interest, among other possibilities. Points 614-620 may define a boundary of an area or volume of drop-off location 604. Points 614-620 may be scanned in a sequence by one or more sensors 402 on the vehicle 400 to scan the area or the volume of drop-off location 604. Points 614-620 may be scanned before the vehicle 400 drops off the object 408 at the drop-off location 604 to ensure that the drop-off location 604 is free of obstacles. The plurality of points 614-620 may define a boundary of a volume to be occupied by the object 408 at the drop off location 604.

In some embodiments, the plurality of points 614-620 may be points in a 2D plane defining the floor of the drop-off location 604. The control system may determine or assume that drop-off locations are sufficiently tall to fit any objects placed therein without risk of collision (e.g., pallets always fit on pallet racks). Thus, the sensors of the vehicle might scan only the floor of the drop-off location 604 to verify that the drop-off location is free of obstacles. In other embodiments, the plurality of points 614-620 may be points in 3D space defining a boundary of the volume to be occupied by the object 408 at the drop-off location 604. Additional points not illustrated in FIG. 6A may be determined in order to define a 3D space. When determining the plurality of points, a margin of error may be included to define a volume that is larger than the actual volume and/or dimensions of the object 408 to account for any error in sensing and/or vehicle control.

In some embodiments, that plurality of points may be vertices of a convex hull defining the boundary of the volume to be occupied by vehicle 400 and/or the object 408 at the drop-off location 604. In other embodiments, the plurality of points may be vertices of a convex hull defining the boundary of a volume of a container to be occupied by the object 408 at the drop-off location 604. The convex hull of the volume to be occupied by the object may encompass a smaller extent of space than the convex hull of the volume of the container to be occupied by the object. Thus, scanning the convex hull of the volume to be occupied by the object may require less time than scanning the convex hull of the volume of the container to be occupied by the object. On the other hand, using the convex hull of the container to be occupied by the object may allow for a greater margin of error in placement of the object at the drop-off location, thus decreasing the probability of collision with any surrounding structures or objects (e.g., support columns 606-612 and/or pallets 600 and 602).

Figure 6B:
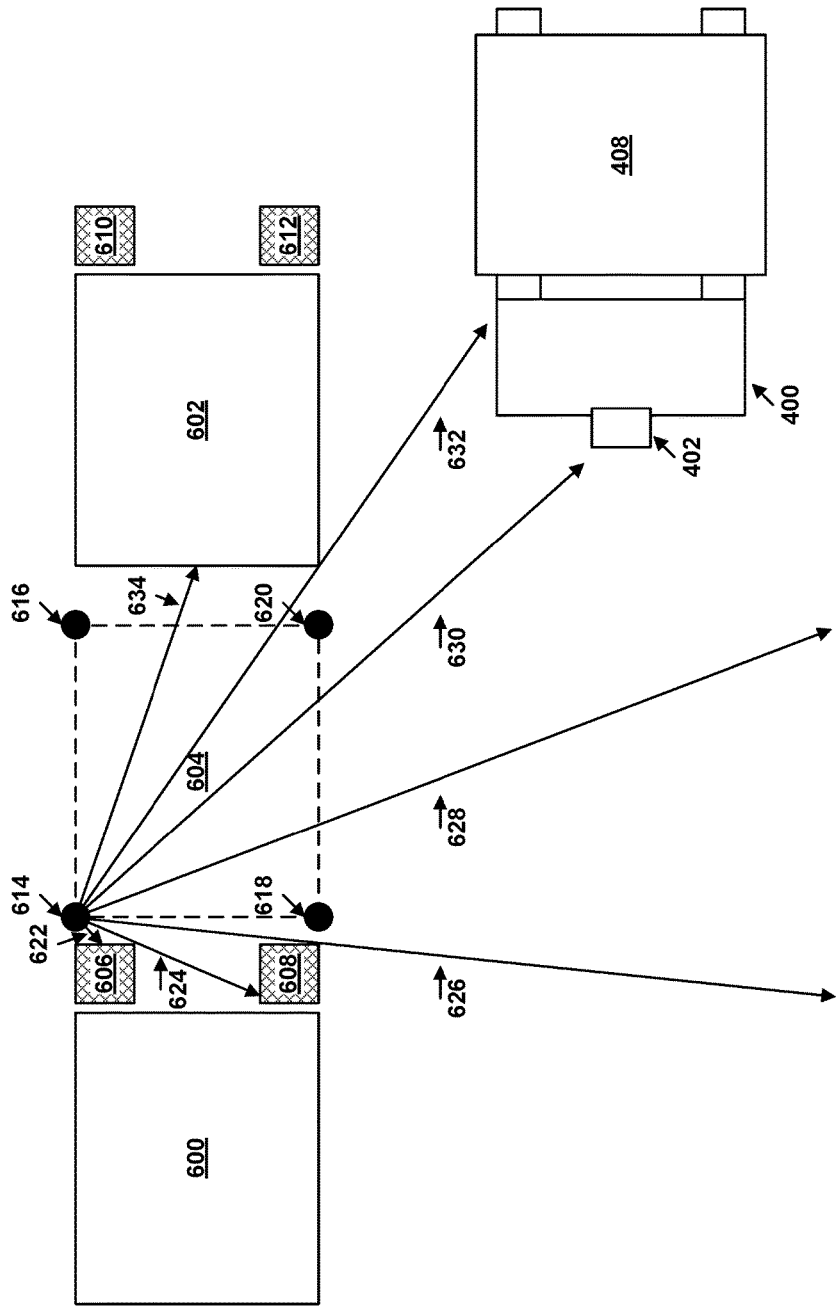
FIG. 6B illustrates lines projected from a point, according to an example embodiment.

Once the plurality of points 614-620 are determined, a respective field of visibility to a respective point may be determined for each respective point of the plurality of points. FIG. 6B illustrates a plurality of lines projecting from a point. Specifically, for point 614, a plurality of lines 622, 624, 626, 628, 630, 632, and 634 projecting outward from point 614 may be determined. A subset of the plurality of lines 622-634 may be determined, where lines of the subset do not intersect with other objects in the environment of the drop-off location 604. For point 614, this subset may include and/or may be defined by lines 626, 628, 630, and 632.

Figure 6C:
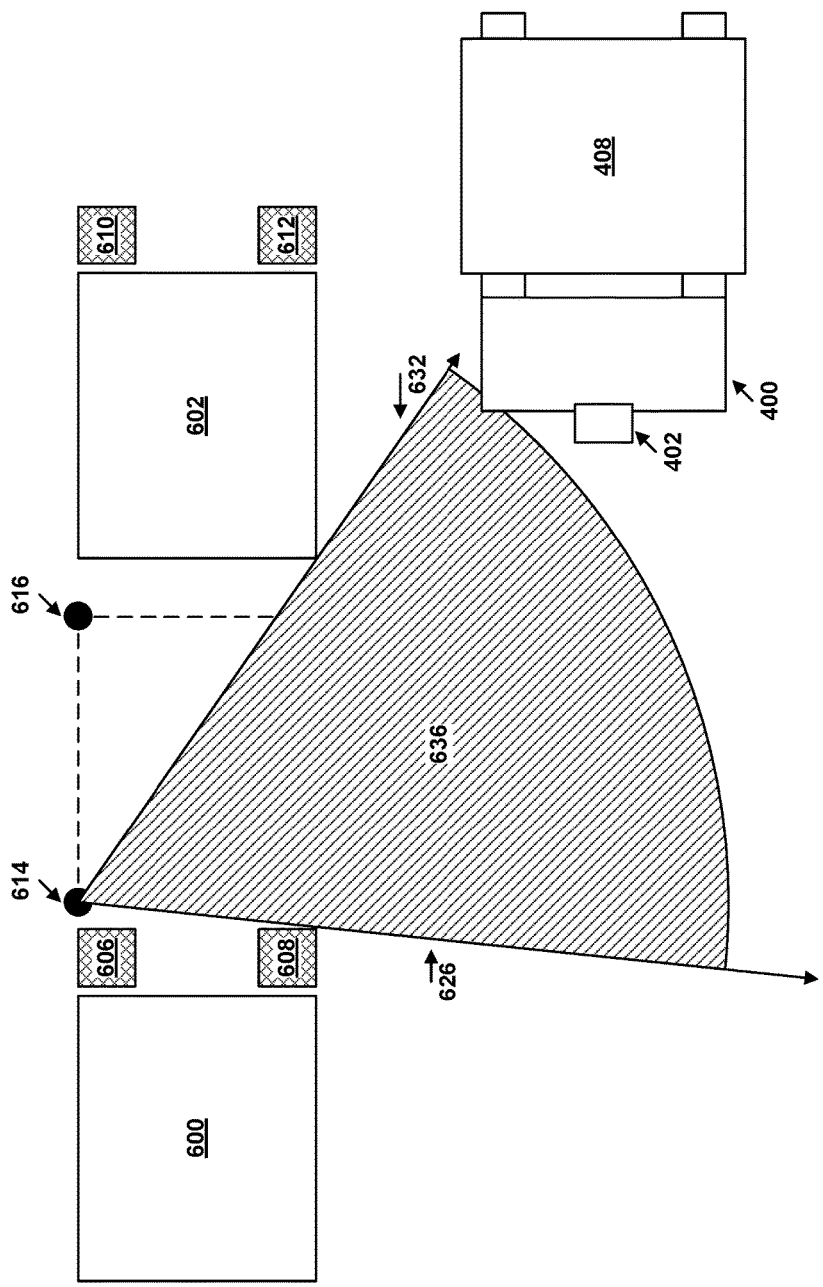
FIG. 6C illustrates a field of visibility defined by lines projected from a point, according to an example embodiment.
Figure 6D:
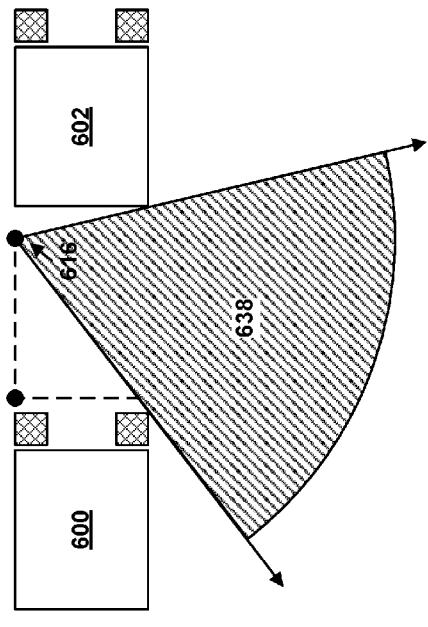
FIGS. 6D, 6E, 6F, and 6G illustrate fields of visibility to points, according to an example embodiment.

FIG. 6C illustrates a field of visibility determined based on the plurality of lines projecting from the point. The subset defined by lines 626-632 that do not intersect with other objects in the environment of drop-off area 604 may define an extent of space 636. Specifically, the extent of space 636 may be the respective field of visibility to point 614. The field of visibility 636 may be defined as the extent of space between lines 626 and 632. The field of visibility 636 may extend further than shown in FIG. 6C (i.e., lines 626 and 632 may be longer and the shaded area therebetween may extend further down than shown in FIG. 6C). A sensor or observer placed within the field of visibility 636 may have a clear line of sight to point 614 and may thus be capable of scanning point 614 and the surrounding area/volume, assuming the sensor is positioned/oriented to account for any sensor blind spots.

In some embodiments, the plurality of lines 622-634 may be determined in parallel. For example, a predetermined number of lines may be projected radially outward from point 614 at particular angular intervals. The subset of lines that do not intersect with other objects in the environment of the drop-off location 604 may be used to define an extent of space. Additional lines may be projected radially outwards from point 614 within and around the extent of space defined by the subset of lines. These additional lines may be projected at smaller angular intervals to perform a fine-grained obstacle detection analysis within the extent of space. Based on the fine-grained obstacle detection analysis, the extent of space may be narrowed or widened to define the field of visibility.

Alternatively, the plurality of lines 622-634 may be determined sequentially. For example, the first projecting line 622 may be projected at a particular angular position. Additional lines 624 and 626 may be projected at particular intervals until a first line (e.g., starting line 626) is found that does not intersect with other objects or environmental features surrounding drop-off location 604. Once starting line 626 is identified, additional lines 626, 630, 632, and 634 may be projected until a second line (e.g., stopping line 632) is found preceding a line (e.g., line 634) that intersects with another object or environmental feature surrounding drop-off location 604. The extent of space between starting line 626 and stopping line 632 may define the respective field of visibility to point 614.

Although FIGS. 6B and 6C illustrate lines 622-634 and field of visibility 636 in 2D space, the same operations are equally applicable in 3D space. In particular, the field of visibility to point 614 may be a conical volume defined by the subset of lines that do not intersect with objects, obstacles, or environmental features surrounding drop-off area 604. Further, the density of the projected lines may be lower or higher than illustrated. In some examples, line density may be varied to perform a coarse or a refined scan.

Figure 6E:
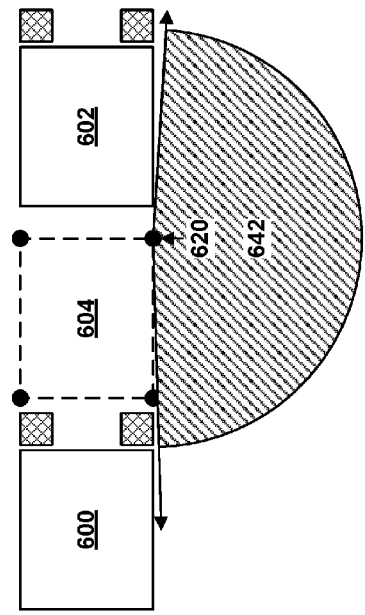
Figure 6F:
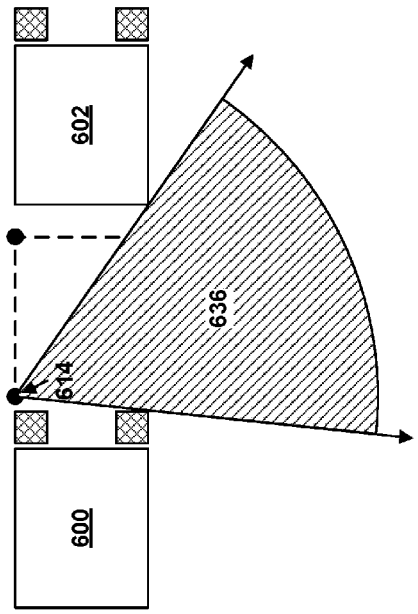
Figure 6G:
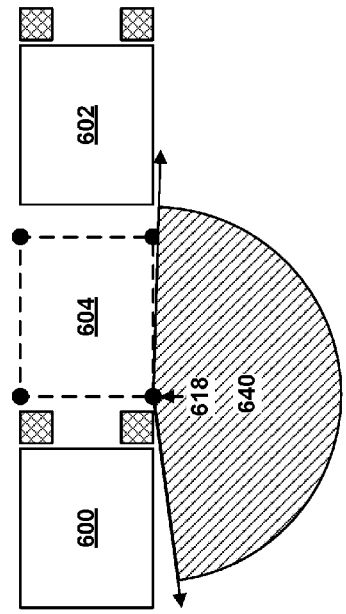

The operations for determining the field of visibility 636 for point 614 may be repeated for any additional points, as illustrated in FIGS. 6D, 6E, 6F, and 6G. In particular, FIG. 6D reproduces the field of visibility 636 determined for point 614, as shown in FIG. 6C. FIG. 6E illustrates a field of visibility 638 determined for point 616 using the operations described with respect to FIGS. 6B and 6C. FIG. 6F illustrates a field of visibility 640 determined for point 618 using the operations described with respect to FIGS. 6B and 6C. Finally, FIG. 6G illustrates a field of visibility 642 determined for point 620 using the operations described with respect to FIGS. 6B and 6C.

VII. EXAMPLE OPERATIONS FOR PLANNING AND VALIDATING A VEHICLE PATH

Figure 7A:
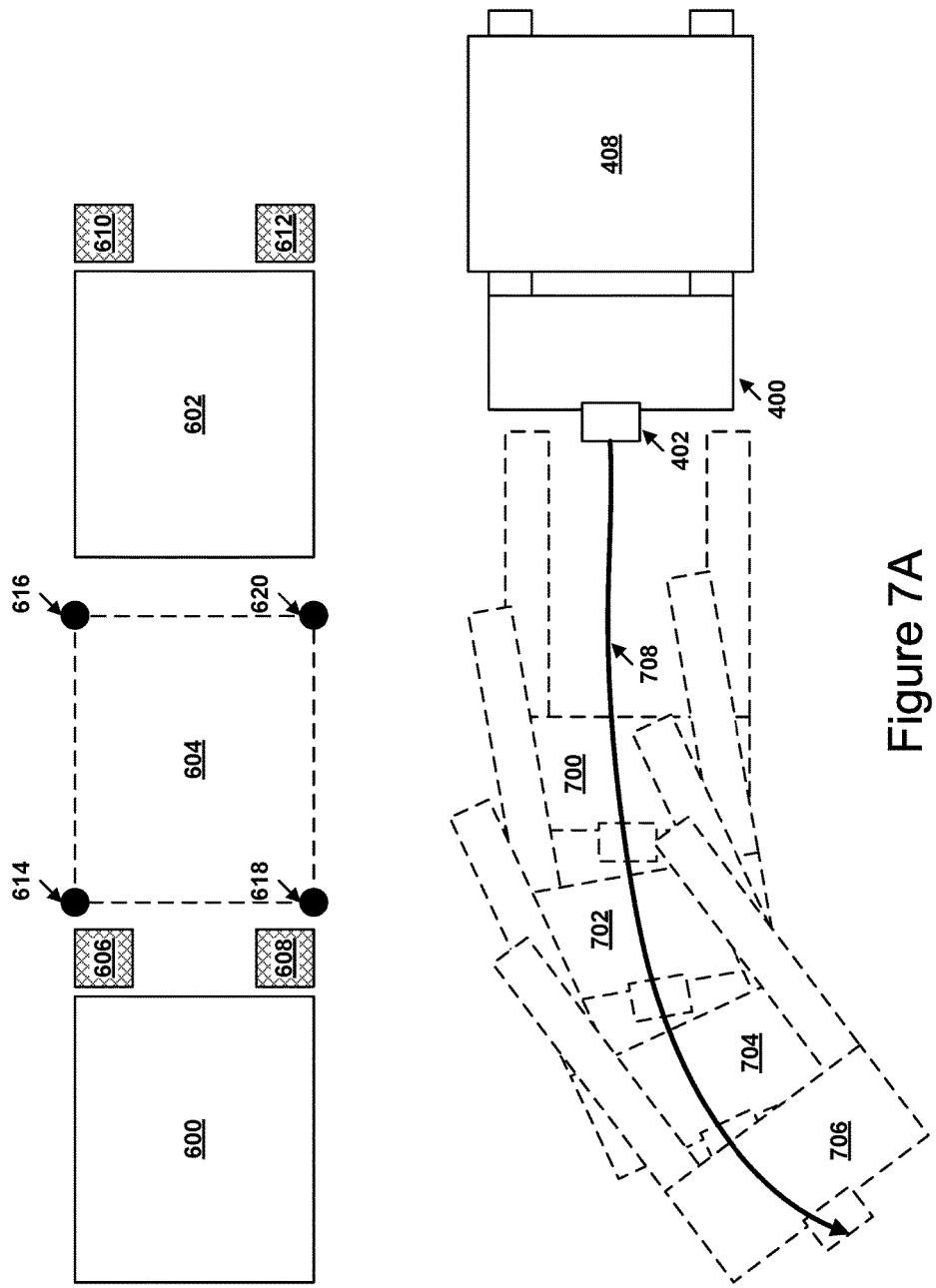
FIG. 7A illustrates a section of a determined path, according to an example embodiment.
Figure 7B:
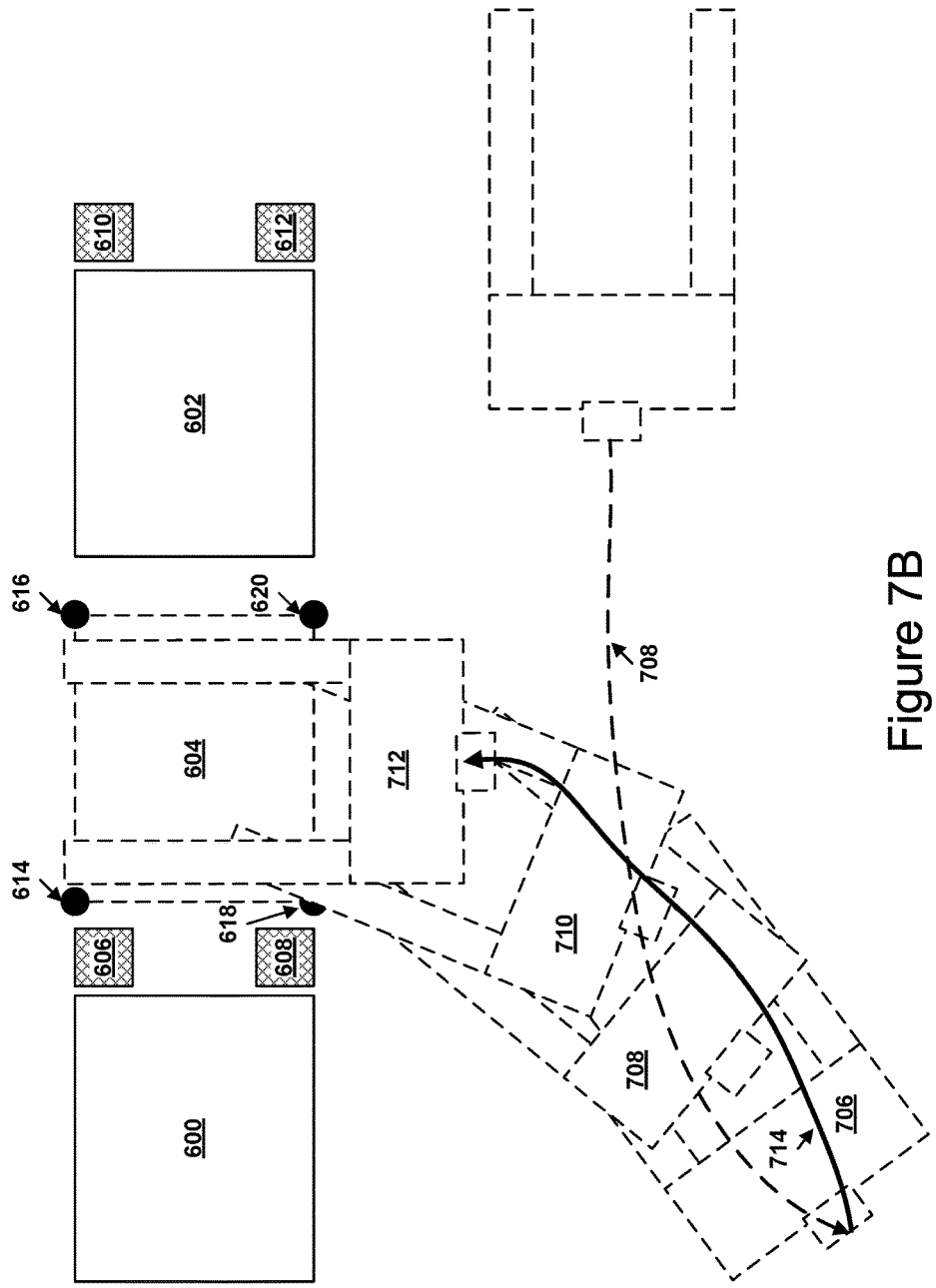
FIG. 7B illustrates another section of a determined path, according to an example embodiment.

FIGS. 7A and 7B illustrate example operations for determining a path for the vehicle to follow to the drop-off location 604 based on the respective field of visibility 636-642 determined for each of points 614-620, respectively, as described with respect to FIGS. 6A-6G. Specifically, FIG. 7A illustrates a first determined path section 708 along which pallet jack 400 carrying object 408 may be planned to move. Path section 708 may cause pallet jack 400 to drive past the drop-off location 604 to make at least one of the point 614-620 observable to sensor 402. Projections 700, 702, 704, and 706 of the extent of space predicted to be occupied by pallet jack 400 and object 408 may be determined along path section 708 (projections 700-706 omit illustration of object 408 for visual clarity but are nevertheless intended to represent the union of pallet jack 400 and object 408).

FIG. 7B illustrates a second determined path section 714 along which pallet jack, carrying object 408, may be planned to move from the end of path section 708 to the drop-off location. Projections 708, 710, and 712 of the extent of space predicted to be occupied by pallet jack 400 and object 408 may be determined along path section 714 (projections 708-712 omit illustration of object 408 for visual clarity but are nevertheless intended to represent the union of pallet jack 400 with object 408). Pallet jack 400 may need to enter the drop-off location 604 in the orientation shown in FIG. 7B to leave object 408 in the drop-off location and continue on to a next planned task. Pallet jack 400 might not be able to drive through the drop-off location (e.g., enter on the side defined by points 618 and 620 and exit via the side defined by points 614 and 616).

In some embodiments, path section 708 and 714 may collectively represent a nominal path provided for pallet jack 400 to follow to drop-off location 604 by a global control system. In other embodiments, path sections 708 and 714 may collectively represent a modified version of the nominal path provided for pallet jack 400 to follow to drop-off location 604 by the global control system. The modifications to the nominal path may have been performed to allow sensor 402 to scan each of critical points 614-620. In further embodiments, path sections 708 and 714 may collectively represent a candidate path selected from a plurality of candidate paths that pallet jack 400 may follow to drop-off location 604. Yet further, path sections 708 and 714 may collectively represent a path planned from scratch, without relying on a nominal path or any predetermined candidate paths by a control system, global or local, of pallet jack 400. The path may have been planned given the constraints defined by (i) the fields of visibility 636-642 corresponding to points 614-620, respectively, (ii) any sensor blind spots of sensor 402, (iii) the map of the environment (and any features thereof or objects therein) in which pallet jack 400 is operating, and (iv) current and planned locations of other vehicles and/or robotic devices operating within the environment (e.g., based on lanes of traffic reserved for the other vehicles/robots and/or based on planned paths of the other vehicles/robots).

Figure 7C:
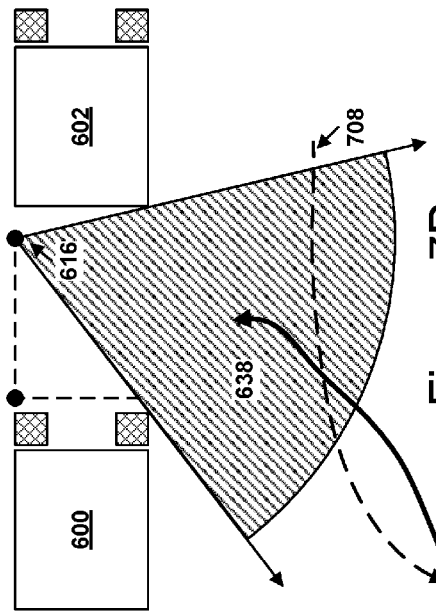
FIGS. 7C, 7D, 7E, and 7F illustrate intersections between a determined path and fields of visibility to points, according to an example embodiment.

The determined path comprising sections 708 and 714 may be verified and validated to determine whether each of the points 614-620 will be observable to the sensor 402 as the vehicle moves along the determined path (e.g., sections 708 and 714), as illustrated in FIGS. 7C, 7D, 7E, and 7F. Specifically, a first operation of the validation process may include determining an intersection between a particular field of visibility and the determined path. In particular, the field of visibility 636 corresponding to point 614 may be intersected with the determined path (e.g., path sections 708 and 714) to determine whether at least one portion of the determined path intersects with the field of visibility 636, as illustrated in FIG. 7C.

Figure 7D:
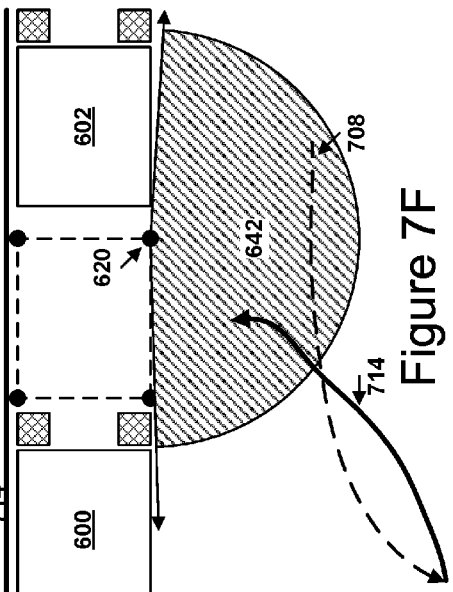
Figure 7E:
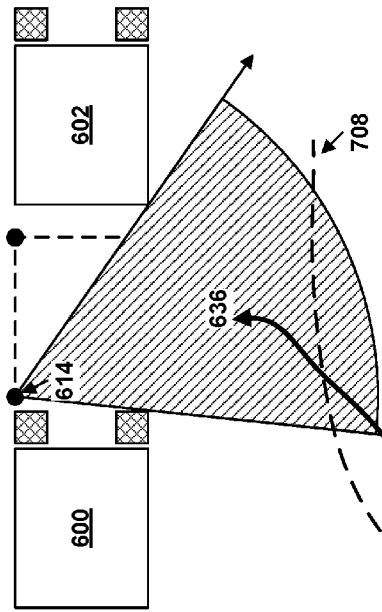
Figure 7F:
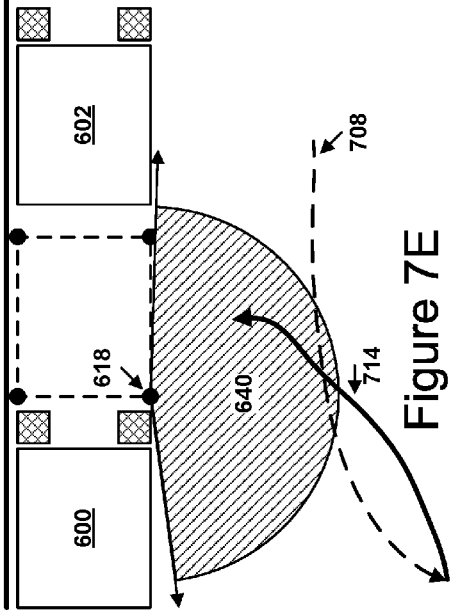

This operation may be repeated for each of points 616-620. Specifically, the field of visibility 638 corresponding to point 616 may be intersected with the determined path (e.g., path sections 708 and 714) to determine whether at least one portion of the determined path intersects with the field of visibility 638, as illustrated in FIG. 7D. The field of visibility 640 corresponding to point 618 may be intersected with the determined path (e.g., path sections 708 and 714) to determine whether at least one portion of the determined path intersects with the field of visibility 640, as illustrated in FIG. 7E. The field of visibility 642 corresponding to point 620 may be intersected with the determined path (e.g., path sections 708 and 714) to determine whether at least one portion of the determined path intersects with the field of visibility 642, as illustrated in FIG. 7F.

In implementations where sensor 402 does not have any sensor blind spot, determining that at least a portion of the determined path intersects with the field of visibility for a particular point may be sufficient to ensure that the particular point will be observable to sensor 402 along the determined path. However, in implementations where sensor 402 includes a sensor blind spot caused by, for example, obstruction of sensor 402 by object 408 or when sensor 402 is connected to pallet jack 400 in a fixed manner (e.g., sensor 402 is not translatable and/or rotatable with respect to pallet jack 400), additional operations may be performed to verify that a particular point will be observable by sensor 402 along the determined vehicle path. Specifically, sensor blind spot may be considered by determining whether at least a section/sub-section of the path portion intersecting with a respective field of visibility provides a clear line of sight between the sensor field of view and the respective point.

FIG. 8A illustrates example operations that may be performed to verify that a particular point of the plurality of points will be observable by one or more sensors. Specifically, FIG. 8A illustrates the intersection of the field of visibility 636 with the determined path section 708. A projection 700 of the pallet jack 400 carrying object 408 may be determined along the portion of path section 708 that intersects with field of visibility 636. Additionally, a projection of observable region 410 accounting for any blind spots of sensor 402 may be determined.

A control system of pallet jack 400 may determine whether point 614 falls within the angular extent of observable region 410. In particular, the control system may determine that at least one line of sight 800 is available between sensor 402 and point 614 when the vehicle is at the point along determined path section 708 illustrated by projection 700. Observable region 410 may extend radially outward to a greater extent than illustrated in FIG. 8A. For example, observable region 410 may extend radially outward to a greater extent than line 800, thus encompassing point 614 within the observable region 410. Accordingly, although point 614 is not shown as falling within observable region 410, sensor 402 may nevertheless be able to scan point 614 and the surrounding area. The path planning operations may take into account the actual radial extent of the observable region 410. Thus, a path may be planned that ensures that a particular point falls within (i) the angular extent of the observable region 410 as well as (ii) within the radial extent of the observable region 410 of sensor 402.

In contrast to FIG. 8A, FIG. 8B illustrates an instance where, although path section 714 intersects with field of visibility 636, a blind spot of sensor 402 may prevent sensor 402 from scanning point 614 when pallet jack 400 is at the portion of the path 714 illustrated by projection 710. In other words, no line of sight may be available between sensor 402 and point 614 when pallet jack 400 is at a location along path 714 indicated by projection 710. A line of sight would have been available if pallet jack 400 entered the drop-off location 604 in a manner reverse to that shown (i.e., a manner represented by a 180-degree rotation of projection 710). However, the pallet jack 400 might not be able to drive through the drop-off location 604, thus the alternative approach might not be possible. Accordingly, the control system may need to determine a vehicle path that considers the orientation in which the pallet jack 400 may enter the drop-off area 604 and still ensures that all points can be scanned.

The path validation and verification operations described with respect to FIGS. 7A-7F, 8A, and 8B may be performed for a plurality of projections of the union of pallet jack 400 with object 408 to determine, for each respective point of the plurality of points, whether there is at least one section along the determined path where the respective point may be scanned by sensor 402. If, for a respective point of the plurality of points, a section of the determined path that allows the sensor to scan the respective point is not found, the determined path may be modified, re-planned, or replaced with another candidate path that may be similarly verified and validated. Accordingly, each respective point of the plurality of points may be associated with corresponding sections of the determined path along which the respective point will be observable to the one or more sensors connected to the vehicle.

Accordingly, in some embodiments, a sensor trajectory may be determined through which to move the one or more sensors 402 to scan the area or volume of the target location by scanning each of the plurality of points 614-620 while the vehicle 400 moves along the determined path (e.g., path sections 708 and 714). The sensor trajectory may be determined by determining, for each respective point of the plurality of points 614-620, a respective section of the path at which to scan the respective point. The respective section of the path at which to scan the respective point may be a section within the respective portion of the path that intersects with the field of visibility to the respective point (e.g., field of visibility 636 to point 614) and places the respective point within the observable region 410 of the sensor 402.

A sequence in which to scan each respective point of the plurality of points as the vehicle moves along the determined path may be determined based on the section of the respective portion of the path (i.e., portion of the path intersecting with a respective field of view) determined for each respective point of the plurality of points. A sensor trajectory may be determined that causes the one or more sensors to scan each respective point of the plurality of points according to the determined sequence. In some embodiments, the determined sequence may indicate to scan points 614-620 serially according to their spatial layout (e.g., the order may be 620, 616, 614, and 618). Specifically, the sensor may sequentially sweep across points that are connected by line segments defining the boundaries of the area or volume to be occupied by the vehicle and/or the object at the target location (e.g., the sensor may sweep over the points and the line segments to sweep out the entirety of the area or volume). Accordingly, the sensor may scan the entirety of the area or volume predicted to be occupied by object 408 at drop-off location 604 in a continuous sweeping motion.

Alternatively, when a continuous scan is not possible, the points may be scanned in the order in which the points are observable as the vehicle follows the determined path (e.g., the order may be 618, 620, 614, and 616). Nonetheless, the sensor may sweep across all the points and all the line segments connecting the points. Thus, regardless of exact scanning order, a sensor trajectory may be determined ensuring that the entirety of the drop-off location 604 is scanned by the sensor. While the vehicle moves along the determined path, the one or more sensors may be caused to move along the determined sensor trajectory to scan the volume to be occupied by the object and/or the vehicle at the target location by scanning each of the plurality of points according to the determined sequence.

In some embodiments, the sensor trajectory may include an angular position of the sensor about a yaw axis, a pitch axis, and/or a roll axis over time. Additionally or alternatively, the sensor trajectory may include a translational position of the sensor along an x-axis, a y-axis, and/or a z-axis over time. Time points along the sensor trajectory may correspond to and/or may be synchronized with time points at which the vehicle is planned to be at particular points of the determined path. Accordingly, the sensor trajectory may include a velocity profile with which to move the sensor at corresponding portions of the determined sensor trajectory.

VIII. ADDITIONAL EXAMPLE OPERATIONS

In some embodiments, the path determined for the vehicle to follow to the drop-off location may be modified to make one or more additional points observable by the one or more sensors as the vehicle follows the modified path to the drop-off location. The one or more additional points may be points within another drop-off location for another object carried by another vehicle. A request to scan the one or more additional points may be received by the vehicle from a central control system or from the another vehicle.

Such cooperative sensing may minimize the extent to which the paths of the vehicles operating in a particular area might be modified to ensure that all points in a particular drop-off location are scanned. For example, a first vehicle may be carrying an object destined for a first target location. A second vehicle may be carrying an object destined for a second target location. The first vehicle may be planned to drive past the second target location on the way to the first target location. The first vehicle may be able to scan the points within the second target location with fewer modifications to the path of the first vehicle than might be necessary to modify the path of the second vehicle to ensure that the second vehicle is able to scan all of the points within the second target area.

In some embodiments, the vehicle or a control system thereof may determine a respective amount of time elapsed since scanning each respective point of the plurality of points. The amount of time elapsed since scanning a particular point may be measured from a most recent scan of the particular point by either the vehicle carrying the object destined for the target location containing the particular point or by another vehicle in a fleet of vehicles (e.g., scanned via cooperative sensing). When the determined respective amount of time for each respective point of the plurality of points does not exceed a threshold time value, the vehicle may be caused to move into the target location at a first rate of speed. When the determined respective amount of time for at least one of the plurality of points exceeds the threshold time value, cause the vehicle to move into the target location at a second rate of speed lower than the first rate of speed. In some embodiments, the amount of time elapsed may be a mean, median, minimum, or maximum of the respective amounts of time elapsed since scanning each of the plurality of points.

In other words, when the target location has been recently scanned and the scan revealed no obstructions in the target location, the vehicle may move into the target location quickly due to a high confidence that the target location is still free of obstructions. Specifically, since only a short period of time has elapsed since a most recent scan, there probability that the state of the target location has not changed is high. In contrast, when a considerable period of time has elapsed since a most recent scan (e.g., an amount of time exceeding the threshold time value), the vehicle may move into the target location slowly to minimize the extent of any damage caused by collisions with an obstacle that may have made its way into the target location since the most recent scan. In some embodiments, the vehicle may include collision sensors to detect collisions with obstacles or environmental features and responsively stop the vehicle.

Further, in some embodiments, when the determined respective amount of time for a particular point of the plurality of points exceeds the threshold time value, a path may be determined, according to the operations herein described, that allows the particular point to be observable by the sensor as the vehicle moves along the determined path. When the determined respective amount of time for the particular point of the plurality of points does not exceed a threshold time value, a path may be determined that might not allow the particular point to be observable by the sensor as the vehicle moves along the determined path. Thus, the path planning operations may face fewer constraints and may thus take less time to complete. However, a path may nevertheless be determined allowing the particular point to be observable by the sensor as the vehicle moves along the determined path.

In some embodiments, the time threshold may be dynamically determined based on legal safety standards and/or a determination of whether another vehicle, robot, or human has occupied the target location since the most recent scan. Determining whether another vehicle, robot, or human has occupied the target location may include receiving and/or monitoring data from light curtains or similar sensors ensuring that robots and humans are not operating in the same space at the same time.

In additional embodiments, a velocity profile may be determined for the vehicle to follow as the vehicle moves along the path to the target location. Vehicle velocity may be modulated according to the determined velocity profile as the vehicle moves along the determined path. The velocity profile may allow each of the plurality of points to be observable by the one or more sensors for at least a minimum threshold amount of time as the vehicle moves along the determined path with the determined velocity profile. The velocity profile may indicate to cause the vehicle to slow down or stop at particular sections of the determined path from which one or more of the points may be observable.

For example, a large number of points may be observable from only a particular portion of the determined path. In order to allow all of the large number of points are scanned, the vehicle may need to stop or move at a lower rate of speed to allow the sensor sufficient time to scan each of the observable points. Thus, the velocity profile of the vehicle may allow the sensor sufficient time to acquire a scan of each point. Accordingly, the scan may be of at least a minimum quality as defined by one or more quality metrics or parameters (e.g., exposure time, resolution). A velocity profile of the sensor along the determined sensor trajectory may be determined based on or in combination with the determined vehicle velocity profile.

In some embodiments, determining the path for the vehicle to follow may include determining a first portion of the path and a second portion of the path. The vehicle may be planned to move along the first portion of the path to within a threshold distance of the target location. The first portion of the path may be planned to be traversed by the vehicle at a first rate of speed. The vehicle may be planned to move along the second portion of the path when the vehicle moving into the target location and/or is placing the object at the target location. The second portion of the path may be planned to be traversed by the vehicle at a second rate of speed lower than the first rate of speed.

In additional embodiments, an extent of free space predicted to exist between (i) the vehicle and/or the object at the target location and (ii) one or more other objects in the environment near the drop-off location may be determined. When the extent of free space exceeds a threshold value, the control system of the vehicle may determine to traverse the second portion of the candidate path at a third rate of speed. The third rate of speed may be greater than the second rate of speed and lower than the first rate of speed. When the extent of free space does not exceed the threshold value, the control system of the vehicle may determine to traverse the second portion of the candidate path at a fourth rate of speed. The fourth rate of speed may be lower than the second rate of speed.

Thus, the vehicle may be planned to move at a lower rate of speed when the vehicle is in close proximity to other objects within the environment, such as when dropping off the object at the drop-off location. In contrast, the vehicle may be planned to move at a higher rate of speed when the vehicle is not in close proximity to other objects, such as when traveling down the middle of a warehouse aisle or when dropping off an object in an open area free of other surrounding objects.

In further embodiments, the determined path may be selected from a plurality of candidate paths. The path for the vehicle to follow to the target location may be determined by, for example, a control system of the vehicle using the following operations. A first candidate path may be selected from the plurality of candidate paths. For each respective point of the plurality of points, an intersection may be determined of the respective field of visibility to the respective point with the first candidate path. Based on the intersection determined for each respective point of the plurality of points, the control system may determine whether each of the plurality of points is observable by the one or more sensors along at least a respective portion of the first candidate path as the vehicle moves along the first candidate path to the target location. When each of the plurality of points is observable by the one or more sensors along at least the respective portion of the first candidate path as the vehicle moves along the first candidate path, the first candidate path may be selected as the determined path. When each of the plurality of points is not observable by the one or more sensors along at least the respective portion of the first candidate path as the vehicle moves along the first candidate path, a second candidate path may be selected to test from the plurality of candidate paths.

IX. CONCLUSION

The present disclosure is not to be limited in terms of the embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining, by a control system of a vehicle, a target location for an object carried by the vehicle;
   determining, by the control system, a plurality of points defining a boundary of a volume to be occupied by the object at the target location, wherein the plurality of points are scannable in a sequence by a sensor on the vehicle to produce a scan of the volume;
   determining, by the control system, a respective field of visibility to each respective point of the plurality of points, wherein the respective field of visibility defines a region of space extending from the respective point such that the respective point is unobstructed to the sensor when the sensor is positioned within the region of space;
   determining, by the control system, a path for the vehicle to follow to the target location, wherein the respective field of visibility intersects with a respective portion of the determined path such that each respective point of the plurality of points is observable by the sensor along at least a section of the respective portion of the determined path as the vehicle moves along the determined path to the target location; and
   causing, by the control system, the vehicle to follow the determined path to the target location.

2. The method of claim 1, further comprising:
   determining a sensor trajectory through which to move the sensor to scan each of the plurality of points in the sequence while the vehicle moves along the determined path; and
   while the vehicle moves along the determined path, causing the sensor to move along the determined sensor trajectory to scan the volume to be occupied by the object at the target location by scanning each of the plurality of points in the sequence.

3. The method of claim 2, wherein determining the sensor trajectory comprises:

for each respective point of the plurality of points, determining the section of the respective portion of the determined path at which to scan the respective point;

based on the section within the respective portion of the path determined for each respective point of the plurality of points, determining the sequence in which to scan each respective point of the plurality of points as the vehicle moves along the path; and determining, as the sensor trajectory, a trajectory that causes the sensor to scan the volume to be occupied by the object at the target location by scanning each respective point of the plurality of points according to the determined sequence.

4. The method of claim 2, the method further comprising:

determining an amount of time elapsed since a most recent scan of each respective point of the plurality of points;

when the determined amount of time does not exceed a threshold time value, causing the vehicle to move into the target location at a first rate of speed; and when the determined amount of time exceeds the threshold time value, causing the vehicle to move into the target location at a second rate of speed lower than the first rate of speed.

5. The method of claim 1, wherein determining the plurality of points comprises determining a plurality of vertices of a convex hull defining the boundary of the volume to be occupied by the object at the target location.

6. The method of claim 1, wherein determining the plurality of points comprises determining a plurality of vertices of a convex hull defining a boundary of a volume of a container to be occupied by the object at the target location.

7. The method of claim 1, wherein determining the respective field of visibility to the respective point comprises:

determining a plurality of lines projecting outward from the respective point;

determining a subset of the determined plurality of lines that do not intersect with other objects in an environment of the target location; and determining the respective field of visibility based on an extent of space defined by the subset of the determined plurality of lines.

8. The method of claim 1, further comprising:

determining a velocity profile for the vehicle to follow as the vehicle moves along the path to the target location, wherein each of the plurality of points is observable by the sensor along at least the respective portion of the determined path for at least a minimum threshold amount of time as the vehicle moves along the path with the determined velocity profile.

9. The method of claim 1, wherein determining the path for the vehicle to follow to the target location comprises:

determining a first section of the path to cause the vehicle to drive past the target location, wherein driving past the target location makes at least one of the plurality of points observable to the sensor; and determining a second section of the path for the vehicle to follow from past the target location to the target location.

10. The method of claim 1, further comprising:

modifying the path for the vehicle to follow to the target location to make one or more additional points observable by the sensor as the vehicle follows the modified path to the target location, wherein the one or more additional points are points within another target location for another object carried by another vehicle.

11. The method of claim 1, wherein the determined path is selected from a plurality of candidate paths, and wherein determining the path further comprises:

selecting, from the plurality of candidate paths, a first candidate path;

determining, for each respective point of the plurality of points, an intersection of the respective field of visibility to the respective point with the first candidate path;

based on the intersection determined for each respective point of the plurality of points, determining whether each of the plurality of points is observable by the sensor along at least a respective portion of the first candidate path as the vehicle moves along the first candidate path to the target location;

when each of the plurality of points is observable by the sensor along at least the respective portion of the first candidate path as the vehicle moves along the first candidate path, selecting, as the determined path, the first candidate path; and when each of the plurality of points is not observable by the sensor along at least the respective portion of the first candidate path as the vehicle moves along the first candidate path, selecting a second candidate path to test from the plurality of candidate paths.

12. The method of claim 1, wherein determining the path for the vehicle to follow to the target location comprises:

receiving, from a central control system, a predetermined path for the vehicle to follow to the target location, wherein the central control system is configured to synchronize operations of the vehicle with operations of one or more additional vehicles; and modifying the predetermined path to intersect the predetermined path with each respective field of visibility such that each respective point of the plurality of points is observable by the sensor along at least a respective portion of the modified predetermined path as the vehicle moves along the modified predetermined path to the target location.

13. The method of claim 1, wherein determining the path for the vehicle to follow further comprises:

determining a first portion of the path, wherein the vehicle is planned to move along the first portion of the path to within a threshold distance of the target location, and wherein the first portion of the path is planned to be traversed by the vehicle at a first rate of speed; and determining a second portion of the path, wherein the vehicle is planned to move along the second portion of the path when the vehicle is placing the object at the target location, and wherein the second portion of the path is planned to be traversed by the vehicle at a second rate of speed lower than the first rate of speed.

14. The method of claim 13, further comprising:

determining an extent of free space predicted to exist between the object at the target location and one or more other objects in an environment near the target location;

when the extent of free space exceeds a threshold value, determining to traverse the second portion of the path at a third rate of speed, wherein the third rate of speed is greater than the second rate of speed and lower than the first rate of speed; and when the extent of free space does not exceed the threshold value, determining to traverse the second portion of the path at a fourth rate of speed, wherein the fourth rate of speed is lower than the second rate of speed.

15. A non-transitory computer readable storage medium having stored thereon instructions that, when executed by a computing device, cause the computing device to perform operations comprising:
- determining a target location for an object carried by a vehicle;
- determining a plurality of points defining a boundary of a volume to be occupied by the object at the target location, wherein the plurality of points are scannable in a sequence by a sensor on the vehicle to produce a scan of the volume;
- determining a respective field of visibility to each respective point of the plurality of points, wherein the respective field of visibility defines a region of space extending from the respective point such that the respective point is unobstructed to the sensor when the sensor is positioned within the region of space;
- determining a path for the vehicle to follow to the target location, wherein each respective field of visibility intersects with a respective portion of the determined path such that each respective point of the plurality of points is observable by the sensor along at least a section of the respective portion of the determined path as the vehicle moves along the determined path to the target location; and
- causing the vehicle to follow the determined path to the target location.

16. The non-transitory computer readable storage medium of claim 15, wherein the operations further comprise:
- determining a sensor trajectory through which to move the sensor to scan each of the plurality of points in the sequence while the vehicle moves along the determined path; and
- while the vehicle moves along the determined path, causing the sensor to move along the determined sensor trajectory to scan the volume to be occupied by the object at the target location by scanning each of the plurality of points in the sequence.

17. The non-transitory computer readable storage medium of claim 16, wherein determining the sensor trajectory comprises:
- for each respective point of the plurality of points, determining the section of the respective portion of the determined path at which to scan the respective point;
- based on the section within the respective portion of the path determined for each respective point of the plurality of points, determining the sequence in which to scan each respective point of the plurality of points as the vehicle moves along the path; and
- determining, as the sensor trajectory, a trajectory that causes the sensor to scan the volume to be occupied by the object at the target location by scanning each respective point of the plurality of points according to the determined sequence.

18. A system comprising:
- a vehicle;
- a sensor connected to the vehicle; and
- a control system configured to:
  - determine a target location for an object carried by the vehicle;
  - determine a plurality of points defining a boundary of a volume to be occupied by the object at the target location, wherein the plurality of points are scannable in a sequence by the sensor to produce a scan of the volume;
  - determine a respective field of visibility to each respective point of the plurality of points, wherein the respective field of visibility defines a region of space extending from the respective point such that the respective point is unobstructed to the sensor when the sensor is positioned within the region of space;
  - determine a path for the vehicle to follow to the target location, wherein each respective field of visibility intersects with a respective portion of the determined path such that each respective point of the plurality of points is observable by the sensor along at least a section of the respective portion of the determined path as the vehicle moves along the determined path to the target location; and
  - cause the vehicle to follow the determined path to the target location.

19. The system of claim 18, wherein the control system is further configured to:
- determine a sensor trajectory through which to move the sensor to scan each of the plurality of points in the sequence while the vehicle moves along the determined path; and
- while the vehicle moves along the determined path, cause the sensor to move along the determined sensor trajectory to scan the volume to be occupied by the object at the target location by scanning each of the plurality of points in the sequence.

20. The system of claim 19, wherein the control system is configured to determine the sensor trajectory by:
- for each respective point of the plurality of points, determine the section of the respective portion of the determined path at which to scan the respective point;
- based on the section within the respective portion of the path determined for each respective point of the plurality of points, determine a sequence in which to scan each respective point of the plurality of points as the vehicle moves along the path; and
- determine, as the sensor trajectory, a trajectory that causes the sensor to scan the volume to be occupied by the object at the target location by scanning each respective point of the plurality of points according to the determined sequence.

* * * * *